United States Patent [19]

Goertzel et al.

[11] 4,286,329
[45] Aug. 25, 1981

[54] COMPLEX CHARACTER GENERATOR

[75] Inventors: Gerald Goertzel, White Plains; Carl G. Powell, Putnam Valley; Samuel C. Tseng, Yorktown Heights, all of N.Y.

[73] Assignee: International Business Machines Corporation, Armonk, N.Y.

[21] Appl. No.: 104,342

[22] Filed: Dec. 17, 1979

[51] Int. Cl.³ ............ G06F 3/14; G06F 3/12; G09G 3/00
[52] U.S. Cl. ............ 364/900; 340/728; 340/731; 340/750; 340/751; 340/790; 340/799; 340/803; 178/30
[58] Field of Search ........ 364/900 MS File, 523; 358/260, 261; 340/146.3 AC, 146.3 AE, 728, 731, 748, 750, 751, 790, 799, 803, 804; 178/30

[56] References Cited

U.S. PATENT DOCUMENTS

| | | | |
|---|---|---|---|
| 3,936,664 | 2/1976 | Sato | 364/523 |
| 3,980,809 | 9/1976 | Cook | 358/260 |
| 3,999,167 | 12/1976 | Ito et al. | 364/900 |
| 4,068,224 | 1/1978 | Bechtle et al. | 358/260 |
| 4,125,873 | 11/1978 | Chesarek | 364/900 |
| 4,144,405 | 3/1979 | Wakamatsu | 178/30 |
| 4,173,753 | 11/1979 | Chou | 340/146.3 AC X |
| 4,181,973 | 1/1980 | Tseng | 364/900 |

*Primary Examiner*—Raulfe B. Zache

*Attorney, Agent, or Firm*—Jack M. Arnold

[57] ABSTRACT

A character compaction and generation method and apparatus which is particularly adapted to the generation of complex characters such as Kanji characters. A dot matrix defining a given character is compacted into a sparse matrix, with the original character being reconstructed for printing or display from the compacted character defined in the sparse matrix. Each character in the complex character set is compacted and stored in memory one time only, with decompaction being performed each time a given character is to be generated. A set of symbols are defined to represent different patterns which occur frequently in the entire complex character set. Different combinations of the symbols define a given character. The information stored for each sparse matrix representing a given character is comprised of each symbol in the sparse matrix, its position, and its size parameter if the symbol represents a family of patterns which differ only in size. Three groups of different patterns are defined which occur frequently in the complex character set, namely, a first group which has a fixed size for each pattern, a second group which has one size parameter which must be specified for each pattern, and a third group which has a plurality of size parameters which must be specified for each pattern.

6 Claims, 30 Drawing Figures

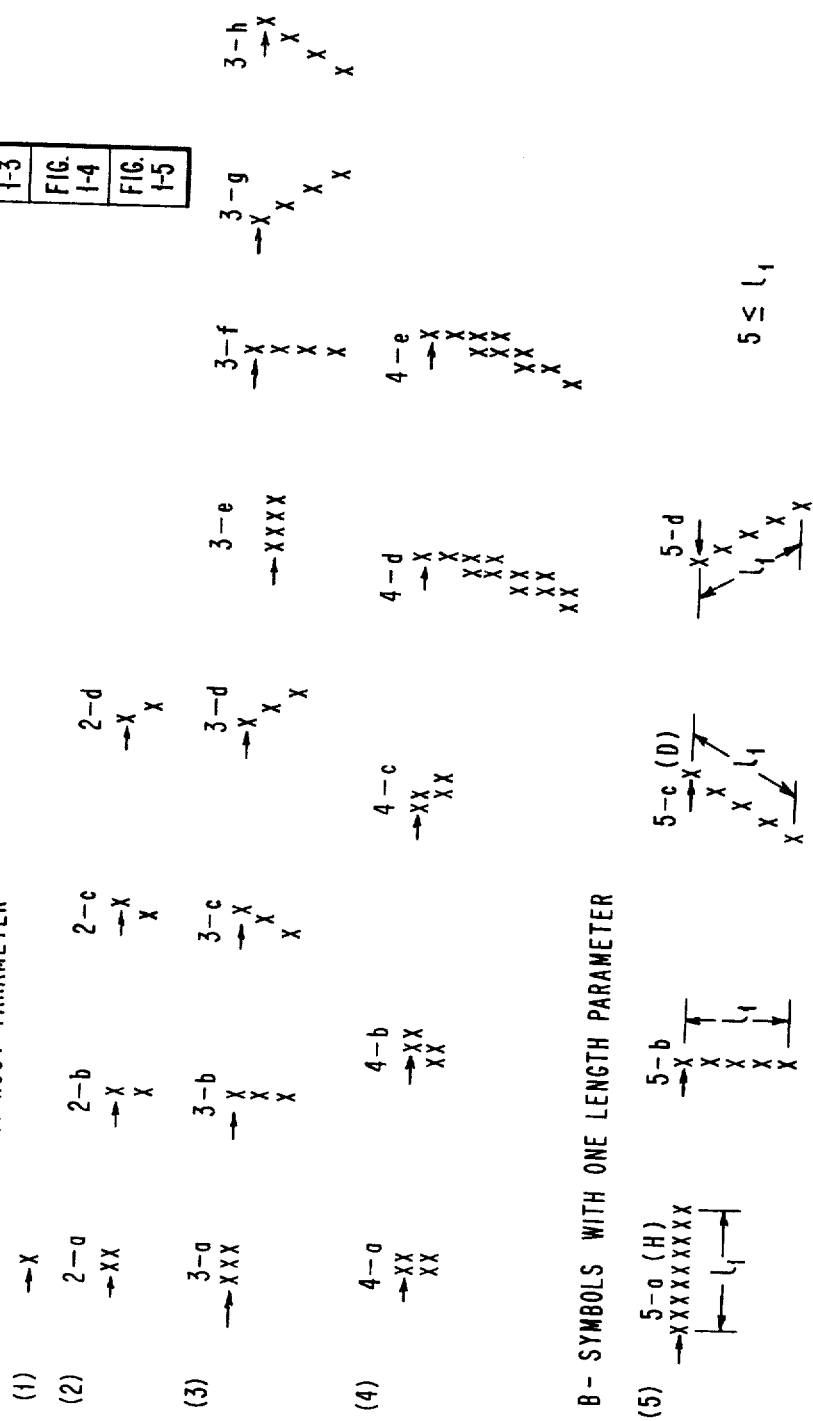

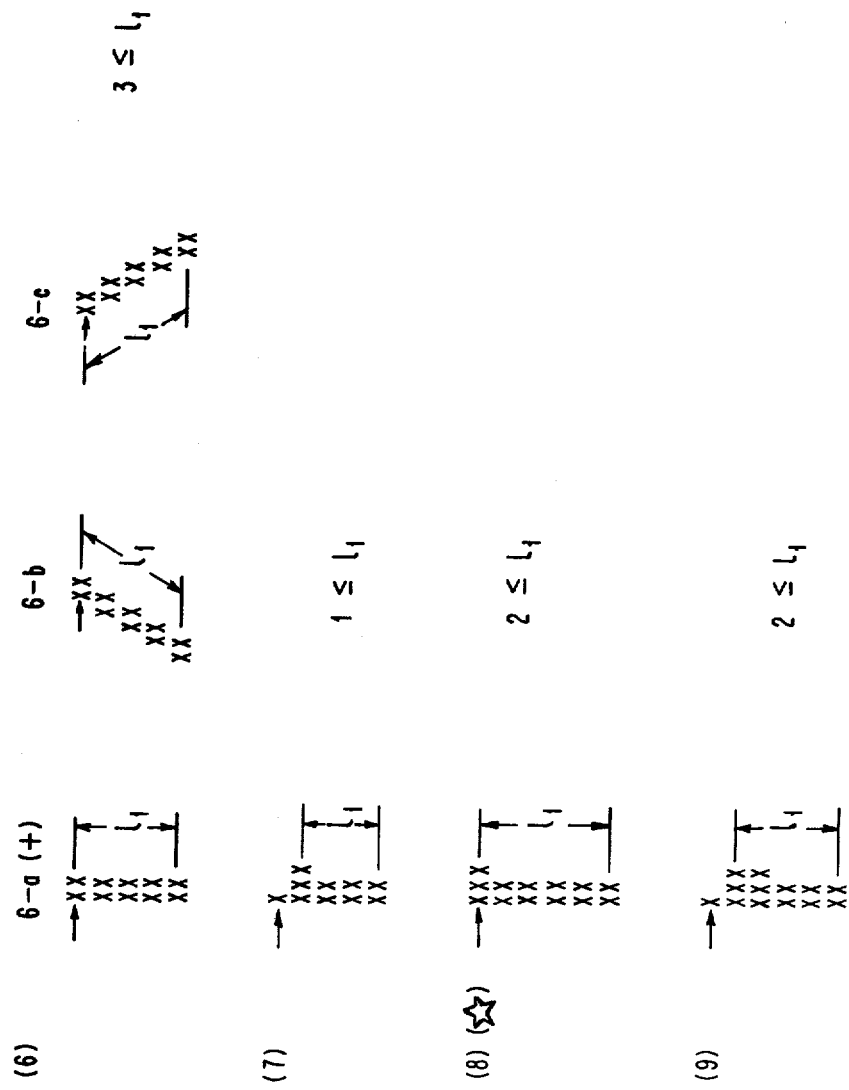

FIG. 1-3
SYMBOLS WITH ONE LENGTH PARAMETER
(10) 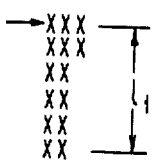     $2 \leq l_1$
(11) 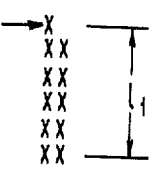     $2 \leq l_1$
(12) 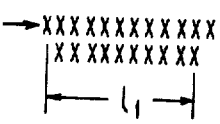     $2 \leq l_1$
(13) 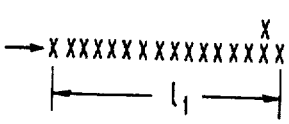     $4 \leq l_1$
(14) ($) 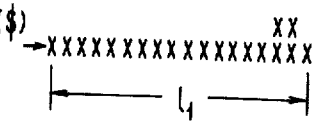     $5 \leq l_1$
(15) 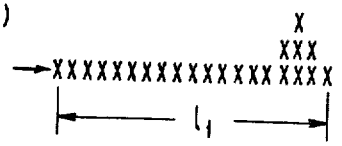     $6 \leq l_1$
(16) 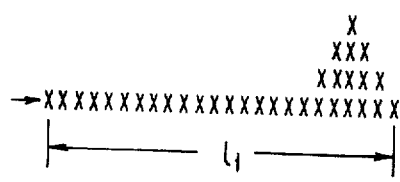     $8 \leq l_1$

FIG. 1-4
C – SYMBOLS WITH 3 LENGTH PARAMETERS
(17)(#)
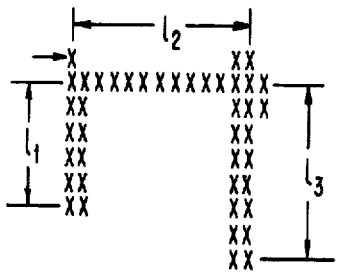
$1 \leq l_1$
$5 \leq l_2$
$3 \leq l_3$
(18)
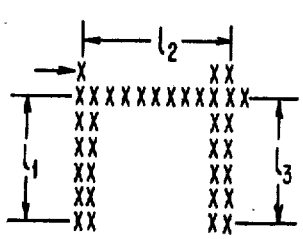
$1 \leq l_1$
$5 \leq l_2$
$1 \leq l_3$
(19)
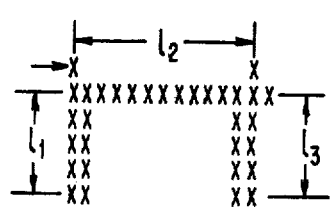
$1 \leq l_1$
$5 \leq l_2$
$1 \leq l_3$
(20)
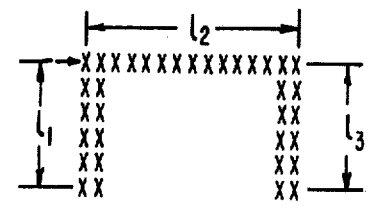
$1 \leq l_1$
$5 \leq l_2$
$2 \leq l_3$
(21)
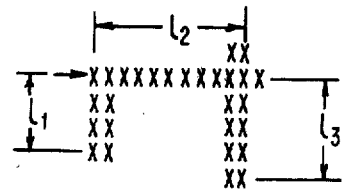
$1 \leq l_1$
$4 \leq l_2$
$2 \leq l_3$
(22)
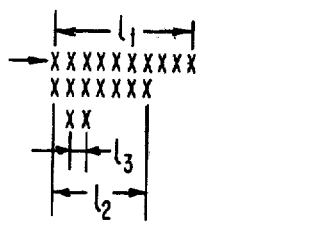
$3 \leq l_1$
$3 \leq l_2$
$1 \leq l_3$

FIG. 1-5
SYMBOLS WITH 3 LENGTH PARAMETERS
(23)
```
     |——— l₁ ———|
  →XXXXXXXXXXX
         XXXX
         XX
   |l₃|—|
     |—l₂—|
```
$3 \leq l_1$
$2 \leq l_2$
$1 \leq l_3$
(24)
```
  |——— l₁ ———|
  XXXXXXXXXXX←
       XXXXX
        XXXX
        |l₃|
        |—l₂—|
```
$3 \leq l_1$
$2 \leq l_2$
$1 \leq l_3$
(25)
```
  |——— l₁ ———|
  XXXXXXXXXXX←
       XXXXXXX
            XXX
       |l₃|—|
       |——l₂——|
```
$3 \leq l_1$
$3 \leq l_2$
$1 \leq l_3$
(26) (&)
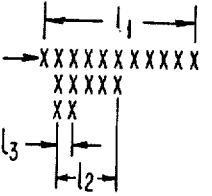
$2 \leq l_1$
$2 \leq l_2$
$2 \leq l_3$
(27)
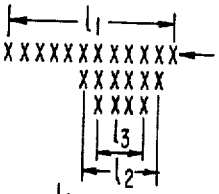
$2 \leq l_1$
$2 \leq l_2$
$2 \leq l_3$
(28) (%)
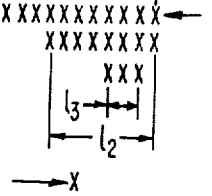
$2 \leq l_1$
$2 \leq l_2$
$2 \leq l_3$
(29)
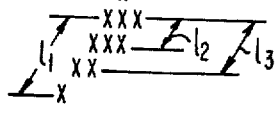
$2 \leq l_1$
$2 \leq l_2$
$2 \leq l_3$

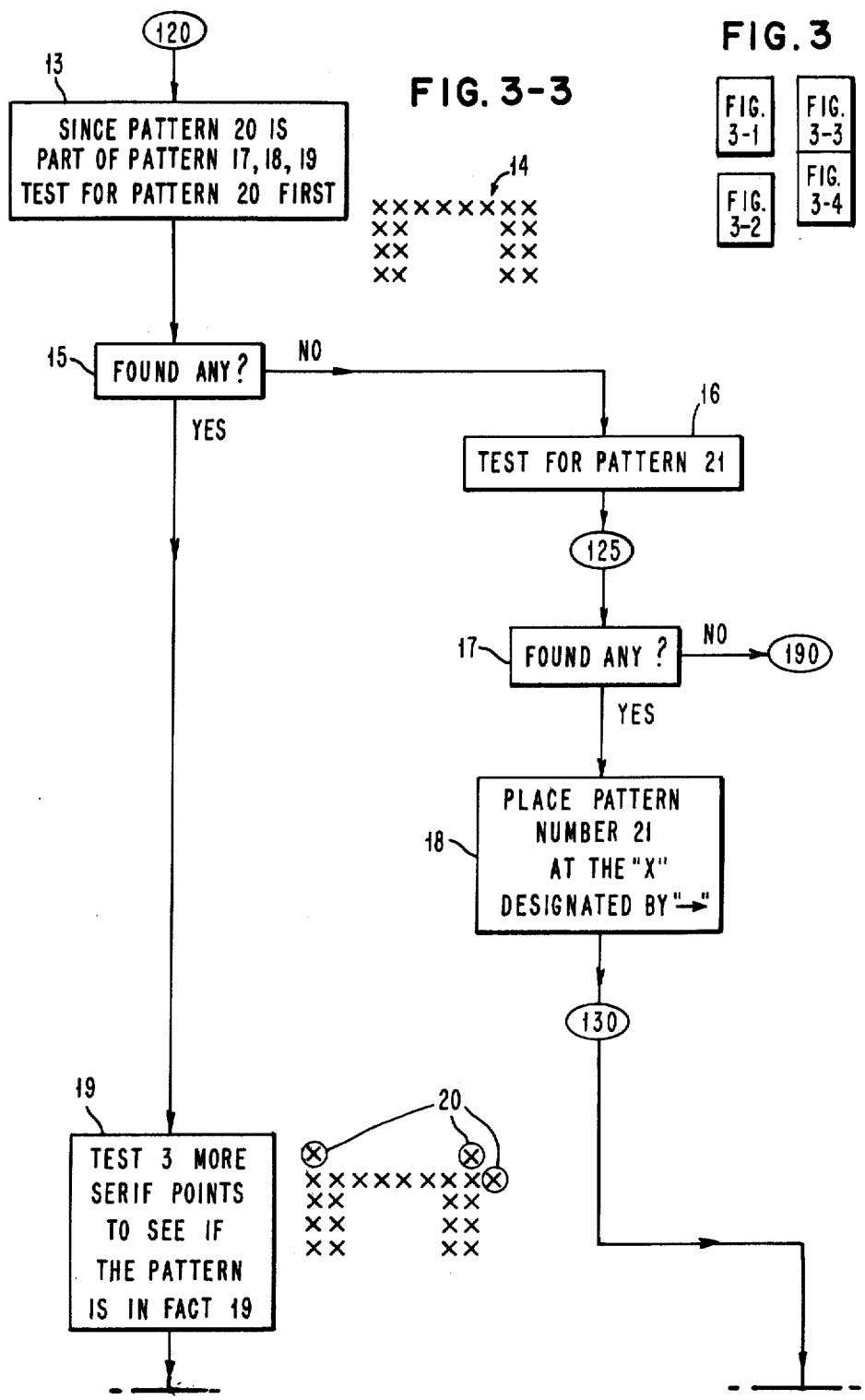

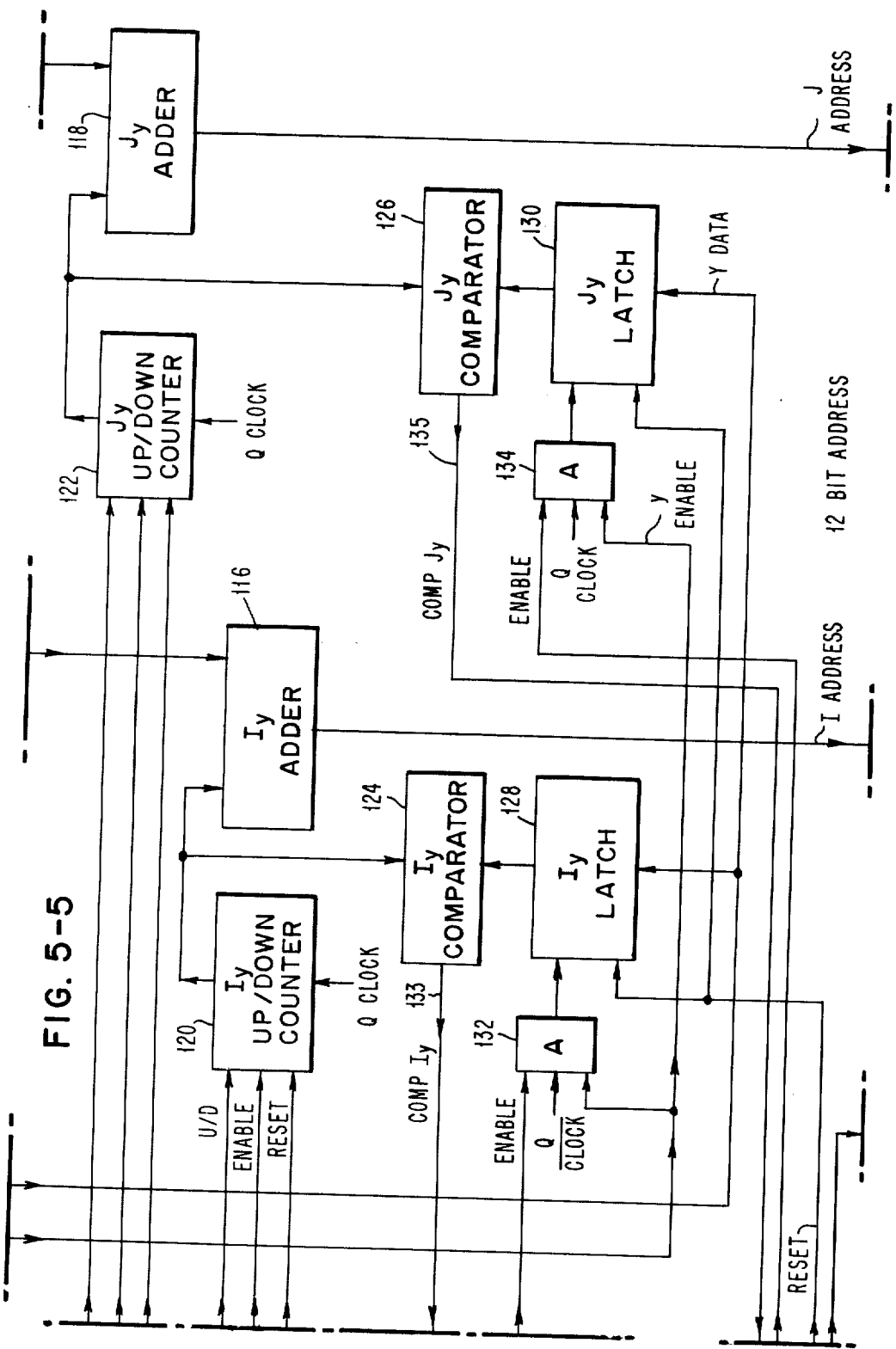

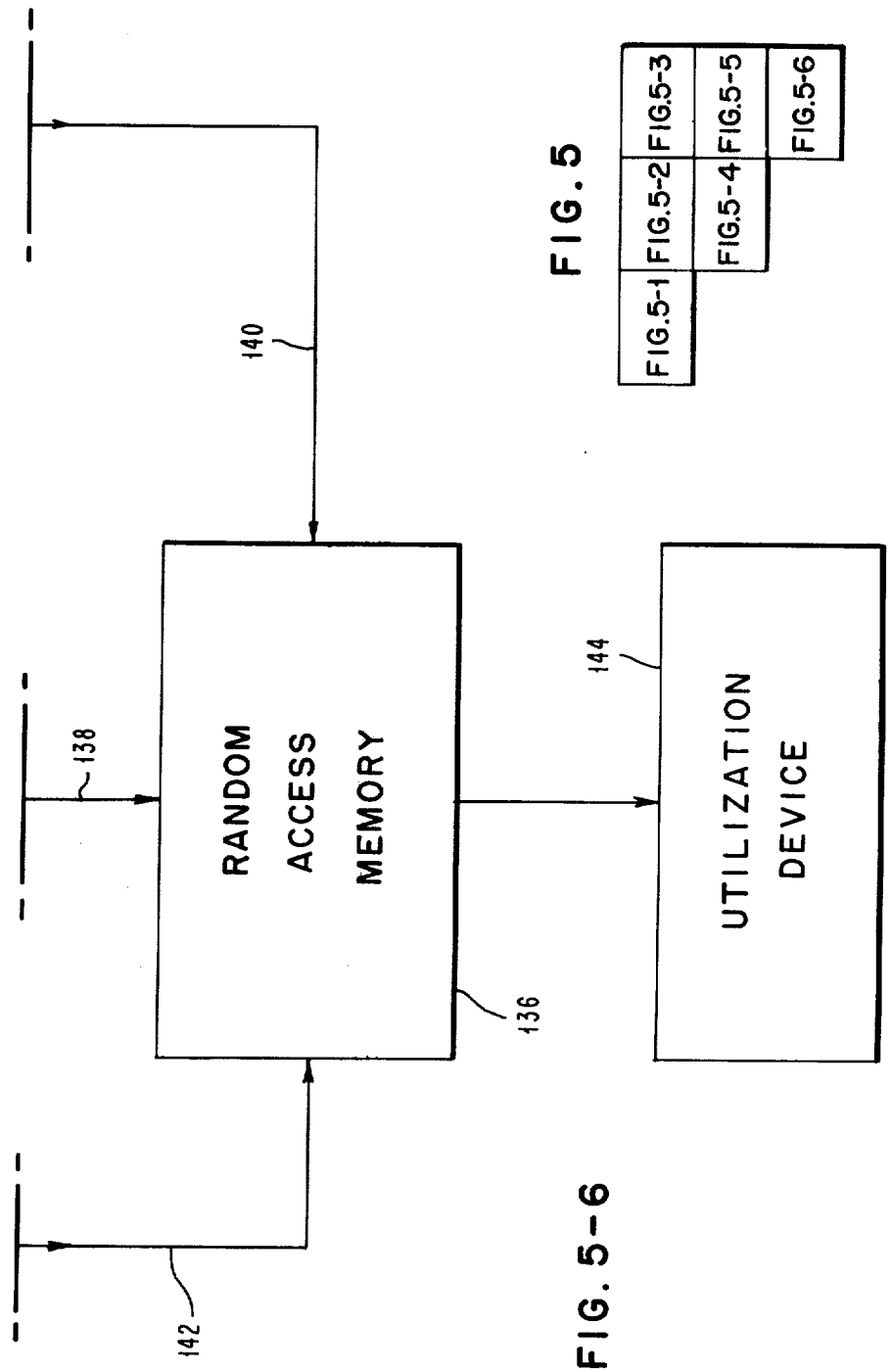

FIG. 6

OUTPUT OF "PLA"

| ROW | Function | FB | Control | data | preset count |
|---|---|---|---|---|---|
| (1) | start (reset) | 00 | 000 | 0000000000 | 1100 |
| (2) | P add I --> S | 01 | 001 | I.....J*** | word length |
| (3) | P rep I --> P | 00 | 010 | I.....J*** | word length |
| (4) | P rep I --> S | 01 | 010 | I.....J*** | word length |
| (5) | S --> P | 00 | 011 | Q Address | word length |
| (6) | S --> 3y | 10 | 100 | Q Address | word length |
| (7) | S --> 2y | 10 | 101 | Q Address | word length |
| (8) | S --> 1y | 10 | 110 | Y value | word length |
| (9) | y --> Y | 10 | 111 | Y value | word length |
| | y --> P | 00 | 111 | | word length |

FIG. 7

A PART OF Q ROS CONTENT

| PTR | ADD | HCP | EIL | EJL | EIC | EJC | HQL | WRT | RIC | RJC | UDI | UDJ | HPL | |
|---|---|---|---|---|---|---|---|---|---|---|---|---|---|---|
| Q31,1 | Q31,2 | 0 | 1 | 0 | 1 | 0 | 0 | 1 | 0 | 0 | 0 | 0 | 0 | Enable Iy latch. Enable Iy count. Write. Enable PLA latch. |
| Q31,2 | Q31,3 | 1 | 0 | 0 | 1 | 0 | 0 | 1 | 0 | 0 | 0 | 0 | 1 | Enable Iy count, count to equal Iy latch. Write each spot. |
| Q31,3 | Q31,4 | 0 | 0 | 0 | 0 | 1 | 0 | 0 | 1 | 0 | 0 | 0 | 1 | Enable Jy count. Reset Iy count. |
| Q31,4 | Q31,5 | 1 | 0 | 0 | 1 | 0 | 0 | 1 | 0 | 0 | 0 | 0 | 1 | Enable Iy count. count to equal Iy latch. Write each spot. |
| Q31,5 | Q31,6 | 0 | 0 | 1 | 0 | 1 | 0 | 0 | 1 | 0 | 0 | 0 | 0 | Enable Jy count & Jy latch. |
| Q31,6 | Q31,7 | 1 | 0 | 0 | 0 | 1 | 0 | 1 | 0 | 0 | 0 | 0 | 1 | Reset Iy count. Enable PLA latch Enable Jy count, count to equal Jy latch. write each spot. |
| Q31,7 | Q31,8 | 0 | 1 | 0 | 1 | 0 | 0 | 1 | 0 | 0 | 0 | 0 | 1 | Enable Iy count & Iy latch. write one spot. |
| Q31,8 | Q31,9 | 1 | 0 | 0 | 1 | 0 | 0 | 1 | 0 | 0 | 0 | 0 | 1 | Enable Iy count, count equal to Iy latch. Write each spot. |
| Q31,9 | Q31,10 | 0 | 0 | 0 | 0 | 1 | 0 | 0 | 1 | 0 | 0 | 0 | 1 | Enable Jy count. Reset Iy latch. |
| Q31,10 | Q END | 1 | 0 | 0 | 1 | 0 | 0 | 1 | 0 | 0 | 0 | 0 | 1 | Enable Iy count. Count to equal Iy latch. Write each spot. |
| Q END | Q END | 0 | 0 | 0 | 0 | 0 | 1 | 0 | 1 | 1 | 0 | 0 | 0 | Reset Iy & Jy count. Enable PLA latch. Hold Q latch. |

COMPLEX CHARACTER GENERATOR

DESCRIPTION

1. Technical Field

The invention is in the field of character generators, and in particular complex character generators, wherein the complex characters are characters such as Kanji characters, Hebrew characters, Arabic characters or the like. The principles of the present invention are also applicable to the generation of any complex pattern. The complex character generator utilizes minimal memory capacity, since the complex characters are compacted, and then decompacted prior to the generation of a given complex character. Heretofore, certain known complex character generators have generated characters by utilizing a memory where the dark patterns of each character of the character set is stored in a memory. That is, a memory cell is allocated for the storage of each element in a given character. It is seen therefore, that with a corresponding memory cell allocated for each element in the character set, it can be appreciated that the memory capacity is quickly used up in the generation of complex characters. For example, in a 32×32 element matrix there are 1,024 elements and therefore, it is necessary to utilize 1,024 bits, that is 128 bytes, to define a given character. Assume therefore, that there is a requirement of on the order of 1,000 bits to generate a given character. If there are 6,000 characters in a given complex character set, it is seen that 6,000,000 storage locations are required to store the information to generate the 6,000 characters. Accordingly, the size and the cost of such a character generation apparatus is prohibitive.

Various methods of complex character compaction such as Kanji character compaction have been reported. They are classified into two general categories. The first is to treat a Kanji ideogram as a general two dimensional picture and to perform the data compaction without the knowledge of the Kanji character itself. Another approach is to make use of the structural characteristics of a Kanji character in its compaction. Since the latter proves to yield a higher compaction efficiency, it will be discussed in more detail.

A commonly known method belonging to the latter type of compaction is "composition of characters from radicals". This method is briefly described as follows. All the Chinese characters may be constructed from about 750 radicals. Thus, instead of storing the 10,000 characters one can store just 750 radicals and generate each character with a composition algorithm. This method is, however, not as simple as it first appears, as it yields high compaction only if the font is designed with compaction in mind at the expense of some sacrifice in the appearance of the characters. This is so, since the given radical may occupy a different position and a different proportion of the whole Kanji character from one character to the next.

Thus, if only one type of a given radical is used for all the Kanji characters containing this radical, the number of radicals for a set of 10,000 characters is indeed 750, but the appearance of the different Kanji characters composed of this radical do not appear correct to the readers of the Chinese Kanji characters. In order to maintain the correct appearance of the characters, one may have to define more than 10 patterns for the same radical, distinguished by different size and relative position of its strokes. This means that the list of radicals increases to more than 7,500. Considering the extra storage space for the character composing instructions, this doesn't result in a great savings as compared to the original 10,000 characters.

Alternatively, one may maintain the radical list at 750 and define parameters to construct each brush stroke of the radical in exactly the right proportion. Then the radical list is the same 750, but the reconstruction instructions must be increased to include all of the parameters to compose the radicals in the right proportion, as well as the complete Kangji character. Consequently, the overall compaction is again reduced.

2. Background Art

There are a number of known character compaction and generation schemes, which decrease the number of memory locations required to generate a given character set, with each having certain advantages and disadvantages. U.S. Pat. No. 3,999,167 to Ito et al discloses a method and apparatus for generating character patterns such as Kanji characters. According to the teachings of this patent every other dot element in the original character matrix is stored, thereby achieving a reduction of ½ in the required memory allocation for the character generator. It is to be appreciated, however, that there is still an appreciable amount of memory utilized for the generation of the Kanji characters according to Ito et al.

U.S. Pat. No. 3,936,664 Sato discloses a character generator for generating Kanji characters, with a given Kanji character being broken down into a plurality of vectors, with the X and Y location, the angle, and the length of the vector being stored. The generated character, however, is only an approximation of the original character and, though a reduction of memory is achieved, the memory space required appears to be excessive.

U.S. Pat. No. 3,980,809 to Cook discloses a character generator, where a library of patterns are stored, wherein the pattern to be generated is compared with a table of reference patterns on an element by element comparison basis until the pattern to be generated is found.

U.S. Pat. No. 4,068,224 to Bechtle et al sets forth a symbol generating apparatus for generating symbols from data stored in a storage device, wherein symbols represented by black and white areas are stored in compressed form, with the symbol being divided into columns and rows, with row position values in each column for white/black and black/white transitions being stored for each column, and with the positional values being referred to a coordinate common to all columns.

U.S. Pat. No. 4,125,873 to Chesarek sets forth a display compress image refresh system utilizing a refresh memory store having coded image information segments representing a visual image which is stored is addressable locations.

U.S. Pat. No. 4,173,753 to Chou discloses an input system for a Sino-Computer characterized by dividing the Chinese characters into six basic strokes, i.e. horizontal, vertical, dot, dash, clockwise and counterclockwise, with each kind of stroke being given a corresponding designated numerical symbol, thereby, according to the exact stroke writing sequence of any character to give each character a spelling number to represent the character, to facilitate the input operation. There is, however, no teaching in Chou to utilize patterns having a plurality of length parameters, or to utilize an overlapping technique to enhance the compaction ratio of the system.

U.S. Pat. No. 4,181,973 to Tseng, and which is assigned to the assignee of the present invention sets forth a character compaction and generation method and apparatus for Kanji characters. A set of symbols are defined to represent different patterns which occur frequently in the Kanji character set, with there being 61 such symbols disclosed. The information stored for each sparse matrix representing a given character is comprised of each symbol (S) in the sparse matrix, its position (P), and its size parameter (Q), limited to 2 length parameters, if the symbol represents a family of patterns which differ only in size. The P, S and Q parameters are stored in three different read only memories (ROM's). The characters are reconstructed serially from the information stored in the P, S, and Q ROM's.

According to the present invention, a complex character generator is set forth in which the strokes, vectors and common patterns in a Kanji character are defined by symbols. The result is a sparse matrix representation of the original Kanji character image. Compaction is achieved by storing not the whole character image, but the information on the non zero element in the sparse matrix. The information on the non zero element contains the location P of the non zero element, the type of symbols S for the non zero element, and the size parameter Y of the pattern, where the size parameter is comprised of a plurality of length parameter which may include three or more length parameters. Whereas the complex character generator of Tseng referenced above, operates in a serial fashion such that a given pattern must be decoded and then written before the decoding process of the following pattern is achieved, the complex character generator of the present invention operates in a parallel mode such that as one pattern is being written the following pattern is being decoded and so on. Further, greater compaction is achieved in the present invention since length parameters having 1,2 or 3 or more parameters are utilized. The encoding method of the present invention allows overlapping of portions of two patterns, such that a further increase in compression is achieved.

BRIEF DESCRIPTION OF THE DRAWING

FIG. 2-1 illustrates a diagram of an original character matrix for a given complex character, which is made up of a plurality of predefined patterns as set forth in FIG. 1, with FIGS. 2-2 through 2-7 illustrating how a sparse matrix representation of the original matrix illustrated in FIG. 2-1 is produced from the predefined patterns set forth in FIGS. 1-1 through 1-5;

FIGS. 3-1 through 3-4 are flow chart representations illustrating how complex characters are encoded according to the patterns set forth in FIGS. 1-1 through 1-3 such that they may store in a memory device such as a read only storage device to subsequently to be read out and reconstructed on a signal utilization device;

FIGS. 4-1 through 4-5 illustrate an "overlapping" technique which is used to increase the compaction ratio according to the present invention;

FIGS. 5-1 through 5-6 when taken together as illustrated in FIG. 5, are a block diagram representation of a complex character generator according to the present invention;

FIG. 6 is a table representing the output states of the PLA latch 68 illustrated in FIG. 5-2; and FIG. 7 is a table representing a part of the states of the QROM 104 illustrated in FIG. 5-4.

DISCLOSURE OF THE INVENTION

Figure 2:
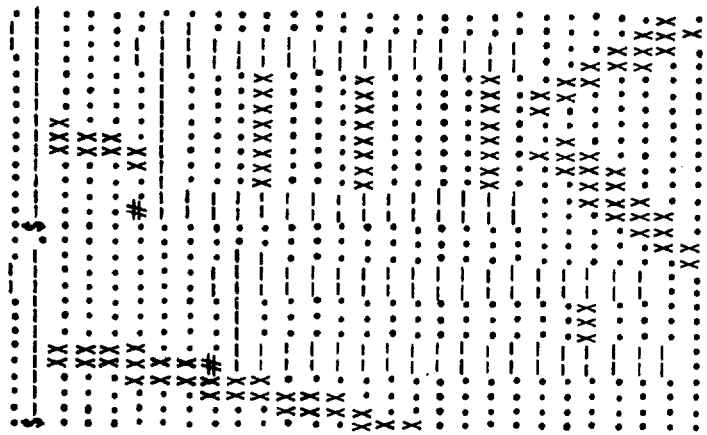
FIGS. 1-1 through 1-5 comprise three groups of predefined patterns which are used to define a given complex character in a complex character set.

Method and apparatus for compacting and generating characters in a complex character set is described. Each character is described by elements in an m by n element matrix, where m and n are integers which may or may not be equal. A plurality of patterns which occur frequently in the complex character set are defined, with a different symbol being assigned to represent each one of the different patterns. A sparse m by n character matrix is defined for each character in the complex character set in terms of the symbols representing the combination of the different patterns forming the corresponding uncompacted character. For each pattern in a given character, its position in the sparse matrix is represented by its assigned symbol being positioned where a predetermined one of the elements in the corresponding pattern in the uncompacted character is positioned. The information stored for each sparse matrix representing a given character is comprised of each symbol in the sparse matrix, its position, and its size parameter, which may include three or more length parameters if the symbol represents a family of patterns which differ only in size. An overlapping technique is utilized for increasing the compaction efficiency of the system. The decoding of a compacted character is accomplished in a parallel mode of operation, such that when one pattern is being written, the following pattern is being decoded, such that the system speed of operation is enhanced.

BEST MODE OF CARRYING OUT THE INVENTION

The complex character generator according to the present invention reconstructs an original character image from compacted data representing the original character. A set of patterns are defined to represent vectors, brush strokes, and partial radicals which appear frequently in the entire complex Kanji character set. Different combinations of the patterns define a given character. For an examplary complex Kanji character set, there are defined a plurality of symbols for source encoding representative of three groups of patterns, as set forth below. As illustrated in FIGS. 1-1 through 1-5, there is a first group of patterns, that have no length parameters, and these are the pattern groupings (1) through (4). There is a second group of patterns (5) through (16) which have one size parameter. There is a third group of patterns, (17) through (29) which have at least three length parameters, wherein the length of the size parameters are variable, and in certain instances may be equal. Note than an X represents a black picture element (PEL) and that the arrow symbol (→) denotes where a symbol representative of that pattern is positioned in a sparse matrix when utilizing a vertical scan.

The compaction technique to be described, is applicable to any size matrix. For example, the compaction technique may be utilized, for example, with a 28×22, 28×28, 32×32, or 36×36 matrix. By way of example, a representative compaction technique is described as follows for a 32 by 32 font. For a fixed length of representation of data for a non-zero element, represented by the arrow symbol, 10 bits is needed to represent the location "P" of the non-zero element, 5 bits for each coordinate I or J, which represent the vertical and horizontal direction, respectively. Assuming, by way of example only, that 127 symbols are defined to represent 127 patterns, it requires 7 bits to represent a symbol "S". Assuming, by way of example only, a maximum of two size parameters are required to specify some symbols in the set, 12 bits are allocated for these size parameters "Y", and thus one non-zero element is represented by 29 bits. For an average of 23 non-zero elements in a Kanji character, 667 bits, or 83 bytes, of storage is required. The original image is 128 bytes, therefore the compaction ratio is approximately 1.54. This value is somewhat higher than that obtainable from known predictive run length or boundary following techniques.

A variable length data representation may be utilized, since many bits are wasted by representing the data in a fixed length form. The variable length data representation utilizes variable length code words which are assigned to represent location "P", symbol "S" and size "Y". This is accomplished by taking an individual histogram of "P", "S" and "Y" for the entire Kanji character set, and three sets of optimum code, such as Huffman code, are generated. Shorter code words are assigned to those symbols which occur more frequently, and longer code words are assigned to less frequent symbols. In addition to the variable length representation of data, various bit saving techniques are incorporated as described later.

The location of a non-zero element does not always have to be represented by I and J coordinates. Again with reference to a $32 \times 32$ matrix, assume that the sparse matrix is scanned vertically (I = 1 to 32), from the left column to the right column (J = 1 to 32). If the present non-zero element $Sm+1$ (I+dI, J,) is on the same column as the previous non-zero element $Sm(I,J,)$, the location of the present element is completely defined by the relative distance (dI) from the previous element. The relative distance is at most 31 pels, corresponding to 5 bits to represent the location. Therefore, the non-zero element of this type (type A), saves 5 bits from the previous (I,J), representation.

If the present non-zero element is the first in a column, then the relative location of this element is defined by (I,dJ), where $dJ = Jm+1 - Jm$ is the relative distance in J as measured from the previous non-zero element. "I" is the distance from the top of this column, instead of referring to the I coordinate of the previous non-zero element. This convention is utilized to limit the value of "I" to less than 31. For the sake of convenience in discussion, this type of non-zero element is referred to as type B.

There are some sets of type B non-zero elements which occur very often. They are those with locations defined by (I,dJ = 1) and (I,dJ = 2). These elements are defined as type B-1 and type B-2 elements. These types occur so very often, it pays to define the location of these types of elements with one parameter instead of two. Summarizing the above, relative to a $32 \times 32$ matrix, a set of 96 letters can be defined to represent the locations of non-zero element. The 96 is derived from the fact that there are 32 letters for I or J for the type B elements. The same letters may be utilized for the type A elements also. In addition, there are 32 letters for the type B-1 and another 32 for the type B-2.

It may be desirable to increase the number of letters from 96 to 128 by including the other 32 letters for (I,dJ = 3) in case this type of element also occurs in the Kanji character set. Another choice is to define extra letters for the following. In a sparse matrix it may be found that many non-zero elements are spaced from their previous elements by 3,4,5,6 or 7 empty columns. In this instance, it may be worth finding letters to represent the empty columns. In general, an increase in the number of letters for "P" will increase the compaction ratio, because of the number of "P" per Kanji character decreases and approaches the number of "S". The upper limit for the number of "P" per Kanji character is equal to twice the number of "S" and the lower limit is equal to the number of "S". The improvement in compaction, however, is not linear, and tends to saturate as higher probability letters are already defined and the extra letters defined later have a relatively low probability of occurrence. Since an increase in the size of letters also increases the number of logic circuits in the decoding of letters, the statistics of a particular font must be studied and a selection is made of the letters in accordance thereto.

For a $32 \times 32$ Mincho style set for 2,584 Kanji characters, 101 letters may be selected to represent the location of the non-zero elements. The entropy, by way of example, representing one location is 6.12 bits as compared to a 10 bit fixed word representation.

When choosing the symbols "S" representative of the non-zero elements, it is desirable to define on the order of 250 symbols representing vectors, strokes and partial radicals which are common to the character images of the entire Kanji character set. The frequency of the occurrence of the symbols is tabulated over the entire Kanji character set, and a lesser number of symbols, for example 63 to 127, which have a higher probability of occurrence in the Kanji character set are kept. In principle, the more symbols there are, the less non-zero elements there are in a sparse matrix, which results in a higher compaction ratio. Again, the improvement is not linear, in that it gradually saturates as the probability of occurrence decreases. The entropy is approximately 5.2 bits for the size of the symbols in the symbol range of 63 to 127.

For the size parameters "Y" associated with the patterns, not all the patterns contain three or more size parameters. Some are fixed patterns with no size parameters, some have one and some have two parameters. In the fixed data representation 12 bits must be allocated for the size parameter even if the pattern is a fixed size. This is not so for the variable length data representation. There is no fixed number of bits reserved for the size parameter. A histogram taken for a size parameter yields an entropy of about 4.2 bits. This means that no bit is used if the pattern is of fixed size, and an average of 4 bits is used for one size and 8 bits for two size parameters. This results in a considerable saving as compared to the fixed 12 bits.

As stated above, the method set forth is to replace a given Kanji character, that is an original character, by a sparse matrix representation thereof, and store only the non-zero elements of the sparse matrix, instead of the original character image itself. Each non-zero element represents either a partial radical, stroke or a vector. Clearly, the less non-zero elements there are in a matrix, the higher the compaction ratio that results. In order to reduce the number of non-zero elements, it is important to choose the correct patterns for the symbols. The symbols are defined as set forth below.

A Kanji character is comprised of radicals and brush strokes, and a brush stroke is comprised of vectors. Obviously, a vector is more common to each and every Kanji character, thus the code word for a vector is short because the probability of occurrence is high in the Kanji character set. However, the number of non-zero elements in a sparse matrix is large if a Kanji character is coded entirely with vectors, because the vector is the smallest sub pattern. Taking the other extreme, if a Kanji character is encoded entirely with radicals, the number of non-zero elements in a sparse matrix is small, since the radical is the largest pattern. However, the code word for each radical is long, since the radical can appear only in a few tens of characters out of the total set of thousands of Kanji characters. Besides, it requires more than 750 radicals, as described above, to efficiently encode the characters. Now, since the length of the code word increases only at a base two log arithmic rate of the number of symbols, it would be preferred to define a large set of symbols containig radicals rather than a small set containing vectors. Unfortunately, the radicals, which are usually large patterns, require a large size fast memory in decompaction hardware, or a large number of instructions in software. Therefore, it is best to choose partial radicals with a high frequency of occurrence first, brush strokes next and finally vectors, in that order. In other words, the larger the patterns containing more pels, the higher the priority it has in the order of encoding the character image. The vectors are useful to encode the remaining pels after Kanji characters encoded with larger patterns, that is the partial radicals and strokes.

The patterns set forth in FIGS. 1-1 through 1-5, were chosen in accordance with the guidelines set forth above.

Figures 1, 2:
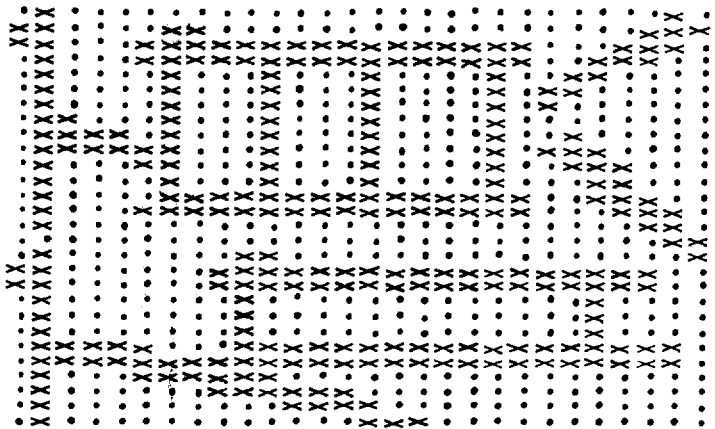

Refer now to FIG. 2-1 which is an exemplary original complex Kanji character image in a 28×28 dot matrix form. Each dot (x) in the original matrix is representative of where a white picture element (pel) is situated. Each of the patterns forming the Kanji character may be represented by a symbol indicative of the pattern as set forth in FIG. 1. The original character matrix of FIG. 2-1 then may be reduced to a sparse matrix in steps as illustrated in FIGS. 2-2 through 2-7. The information stored in a read only storage device, which is the compaction of the sparse matrix illustrated in FIG. 2-7 is:

(1) the non-zero elements, that is the symbol representative of the patterns forming the character in the original matrix of FIG. 2-1.

(2) The positions of the symbols in the sparse matrix.

(3) The size parameters, if the symbol represent a family of patterns which differ only in size, that is the patterns in the groups two and three of FIG. 1.

As previously set forth, the information on the position of each symbol in the sparse matrix is defined as follows. The sparse matrix is scanned vertically (i = 1 to 28) from left most column (j = 1) to the right most column (j = 32). If the first non-zero element, that is the symbol representative of the pattern, is at (I = i, J = 1,) as denoted by the arrow symbol (-→) in the pattern table as set forth in FIG. 1, the position of this symbol is defined by K = i where K = 1 to 28. If the symbol concerned is on K = i to 28 of the same column as the previous symbol, the position of the present symbol is defined by the relative distance from the previous symbol. The maximum possible value is 27 and the same code words k = 1 to 28 are used. If the symbol concerned is Δj column to the right of the previous symbol, and I = i, the position of the symbol is represented by two parameters, i.e. (Δj,i,). The same 28 code words are used for both i and the aforementioned k, and another 28 words for Δj.

That is, the total number of code words for position is 56. Since the maximum possible length of a vector is 28 in the 28×28 matrix, there are 28 possible code words for the size parameters I and J. In summary, there are three sets of code words: 58 for the symbols, 58 for the position and 28 for the size parameters.

Thus, there are three sets of code words respectfully, for P (position), S (symbol) and Y (size). A code generating technique, such as a Huffman code technique, may be used to generate the code words. Shorter words are assigned to the symbols with higher probability of occurrence and longer words for symbols having a lower probability of occurrence. Once the three sets of code words are defined, the sparse matrix can vertically scan into a sequence of symbols as set forth below with reference to FIGS. 2-2 through 2-7.

Figures 2, 3, 4:
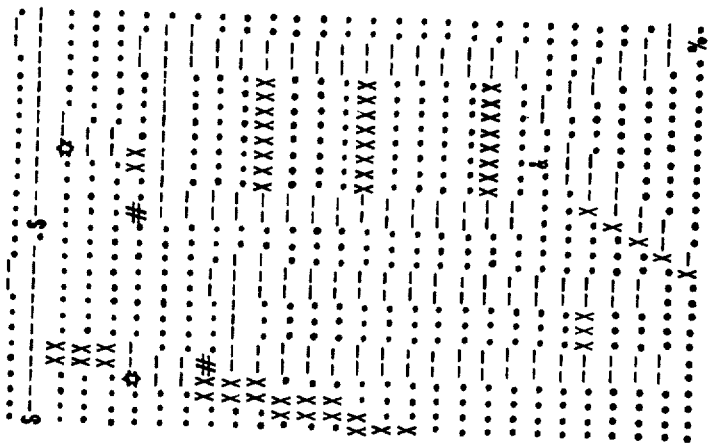
Figures 2, 3:
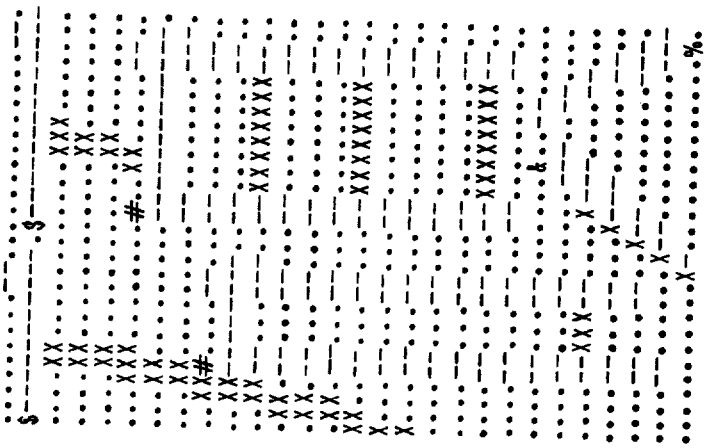

A flow chart representation of how the original character matrix of FIG. 2-1 is vertically scanned column by column to accomplish the character compaction steps necessary to arrive at the final sparse matrix representation as illustrated in FIG. 2-7, is set forth in the flow charts of FIGS. 3-1 through 3-4. In FIG. 3-1, an overall flow chart representation is illustrated, in which at a starting point 100 the original character matrix is initially scanned to encode patterns 17-20, if any exists in the original matrix. This encoding process continues through sequentially less complex patterns from flow chart position 200 through 800 which ends with the most elemental pattern, pattern 1 and the encoding process is ended for a given character.

The flow chart of FIG. 3-2 is a more detailed representation of how the testing process for encoding patterns 17-21 is accomplished. At position $j=1, i=1$, the scanning begins for a black picture element "x" column by column from $i=1$ to $i=m$ at logic block 2. At the following flow chart logic block 3 the question asked is $A(I,J)=x$. If an x indicative of a pel is not found at this position the answer is no and the logical process goes to flow chart position 190. The scan is then incremented to the position $i=i+1$ at logic block 4 by checking the next element in the column. The question is then asked is I greater than M at logic block 5. If the answer to this question is no, the flow chart returns via the keep scan logic block 6 to the position 110. If the answer to this question is yes, this is indicative that one column has been finished and to reset $i=1, j=j+1$ for the next column as indicated at logic block 7. The question at logic block 8 then is j greater than m. If the answer is no, which means there are more columns to scan, the logic flow is returned via the keep scan logic block 6 to the position 110. If the answer is yes, which is indicative of all columns having been scanned, the process is finished for encoding patterns 17-21 as indicated in logic block 9, and the system returns to program position 200 to check if there is encoding required for pattern 12-16 if any, as indicated in FIG. 3-1. The same process continues to check for the encoding of patterns 300-800.

Returning to logic position 120, if the answer is yes that a pel x was found, the system then tests for patterns 17-21 inclusive as indicated at logic block 10. If one of pattern 17-21 inclusive were found, as indicated by a yes emanating from logic block 11, at logic position 130, all black pels "x" for that pattern are replaced with "-" in that pattern except the one pel designated by a "→" which is replaced by the symbol number. The "-" indicates that this pel position is absent on "x" on a subsequent encoding scan for a subsequent pattern. This is more readily apparent when viewing FIGS. 2-2 through 2-7. Following this, the flow chart routine continues to the position 190 and the system flow chart functions as previously set forth.

Flow charts set forth in FIGS. 3-3 and 3-4 set forth in detail how the patterns 17–21 inclusive are tested at the flow chart position 120. With reference to FIG. 1, it is seen that pattern 20 is part of patterns 17, 18, and 19. Therefore, the pattern 20 is tested for initially as indicated at logic block 13, with this pattern being illustrated adjacent thereto at 14. If pattern 20 was not found, as indicated by "NO" emanating from logic block 15, the flow chart proceeds to logic block 16 testing for pattern 21. If the pattern 21 was not found as indicated by a "NO" emanating from logic block 17, the system logic flow returns to flow chart position 190 as set forth in FIG. 3-2, and the system flow chart operation proceeds as previously set forth. If pattern 21 was found, as indicated by a "YES" emanating from logic block 17, pattern 21 is placed at the "x" designated by the "→" as set forth at logic block 18, and the system returns to flow chart position 130 as illustrated in FIG. 3-2, and the system flow chart operation proceeds as previously set forth.

If on the other hand, pattern 20 was found, as indicated by a "YES" emanating from logic block 15, the system then tests for three more serif points at logic block 19, as indicated at 20 to see if the pattern is infact pattern 19. If it has found the pattern is not, as indicated by a "NO" emanating from logic block 21, the symbol indicative of pattern 20 is positioned at the "x" designated by "→" at logic block 22, and the system returns to flow chart position 130 as previously set forth. If pattern 19 is found, the system tests for one more serif point at logic block 23 as indicated at 24 to see if the pattern is in fact 18. If it is not pattern 18, as indicated by a "NO" emanating from logic block 25, the number 19 is placed at the "x" designated by the "→" at logic block 26 and the system flow returns to position 130, and system operation proceeds as previously set forth. If in fact pattern 18 was found, as indicated by a "YES" emanating from logic block 25 the system then tests for one more serif point at logic block 27 and as indicated at 28 to see if the pattern is in fact 17. If it is not pattern 17, as indicated by a "NO" emanating from logic block 29 it is pattern 18, and the symbol indicative of pattern 18 is positioned at the "x" designated by the "→" as shown at logic block 30, and the system flow returns to position 130. If pattern 17 was found, as indicated by a "YES" emanating from logic block 29, pattern 17 is positioned at the "x" designated by the "→" as shown at logic block 31, and the system flow returns to the position 130. Similar detailed flow charts are readily derivable in view of the above, to test for the remaining patterns as designated at flow chart position 200–800 as set forth in FIG. 3-1.

FIGS. 2-2 through 2-7 indicate how the original character matrix of FIG. 2-1 is sequentially scanned to produce the sparse matrix of FIG. 2-7.

FIG. 2-2 illustrates how the flow chart positions 100 and 200 of FIG. 3-1 are successively scanned over the original character matrix of FIG. 2-1 resulting in the encoding of patterns 17 and 14 with the # symbol and the $ symbol, respectively as shown. The original patterns are replaced by the appropriate symbols and "-" as described relative to FIGS. 3-1 through 3-4. FIG. 2-3 then illustrates how the patterns 26 and 28 were scanned and found at flow chart position 300, with these patterns being replaced by the symbol for and ϵ symbol and % symbol, respectively. FIG. 2-4 illustrates how the system then steps to flow chart position 400 to check the encoding of patterns 7–11, with pattern 8 being encoded by the symbols * as indicated. FIGS. 2-5 and 2-6 then illustrates how the system steps from flow chart position 500 to flow chart position 600 to check for the encoding of patterns 5-6. Pattern 6A was encoded at three positions as indicated by the symbol + in FIG. 2-5, and the patterns 5A and 5C were encoded by the symbol H and D respectively as illustrated in FIG. 2-6. The system then continues to flow chart position 700 to check for the encoding of patterns 4, 3, 2. Patterns 2A, 2B, and 3A were encoded as set forth by the symbols 2, 4 and 3A respectively, with FIG. 2-7 being the final sparse matrix representation of the original character set forth in FIG. 2-1. This sparse matrix representation is then stored in appropriate digital form in a read only storage device to subsequently be read out upon demand for subsequent generation of the original character matrix.

In the evolution of the present invention, it is found that a hardware character generator, as subsequently set forth, can in most instances generate complex characters, such as Kanji characters, faster than a utilization device, for example, a printer can output them. This excess speed in the generation of characters, can be traded for a higher compaction efficiency without resultant loss in speed in the manifestation of characters on the utilization device. This may be seen, in reference to FIGS. 4-1 through 4-5. The different characters illustrated in FIGS. 4-1 and 4-2 include a common pattern 32, which is pattern 18, of FIG. 1. Immediately to the left of the pattern 32 in each of FIG. 4-1 and 4-2 are patterns 34 and 36, respectively. The question is, whether to use pattern 34 or 36 in the library of patterns of FIG. 1, to result in the maximum compaction efficiency for the character set It is seen that pattern 34 of FIG. 4-1 is comprised of pattern 36 and pattern 38 of FIGS. 4-4 and 4-5, respectively. If the pattern 36 is chosen to code both FIGS. 4-1 and 4-2, rather than pattern 34, it is seen that the additional pattern 38 which is the pattern 3F, (FIG. 1) must also be utilized to encode in FIG. 4-1. That is, two symbols would be necessary to encode the elements comprising pattern 34 in FIG. 4-1. In other words, pattern 36 (FIG. 4-4) and pattern 38 (FIG. 4-5) would be needed to encode pattern 34 (FIG. 4-3). This is not desirable, since for compaction efficiency it is desirable to keep the set of symbols small. Alternatively, the pattern 34 (FIG. 4-3) could be used to encode FIGS. 4-1 and 4-2 rather than pattern 36. In FIG. 4-1, only the pattern 34 is required for encoding, rather than two as previously set forth. In FIG. 4-2, only the pattern 34 is required for encoding, and the four pels of the pattern 38 that are included in pattern 34 can be treated as overlapping with the pattern 32. As a result, the sparse matrix of FIG. 4-1 will have one less non-zero element, but the four pels in FIG. 4-2 that are common to pattern 32 and 34 will have to be written twice and cost extra time in the character generation. This overlapping is used extensively to reduce the non-zero elements in the sparse matrix representation of a number of the complex characters in the complex character set. The elimination of one non-zero element in a given Kanji character results in a savings of 1 to 2 bytes memory space per Kanji character. It is seen therefore, in a Kanji character set comprised of 600 characters there is a savings of 600 to 1200 bytes in memory space.

The compacted data, that is the sparse matrix representation of each complex Kanji character is stored in a memory device, such as a read only storage device as a binary bit stream, which is the concatenation of code words for the non-zero elements. Each non-zero element has information relative to "P" location, "S" type of symbol, and "Y" the size parameter of the pattern, only when the size parameter is required. The following rules are observed in compaction and decompaction of a given original complex character into sparse matrix form and vice versa.

(1) The first code word is always for "P" of the first non-zero element.

(2) Following each "P" is either another "P" or "S" but not "Y". It is another "P", if the non-zero element is of the type "B" as discussed previously. Otherwise, it will always be "S". Whether the next code word is another "P" or "S" is known from the present "P".

(3) Following "S", the code word can be "Y" or "P". The code word will be "Y" if the present pattern has a size parameter. If not, the next code word will be a "P", the location of the next non-zero element.

(4) Following "Y", the next code word can be another "Y" or "P" but not "S". The code word would be another "Y", if this pattern has more than one size parameter. Otherwise, the code word will be "P" for the next non-zero element.

With the above rules and the fact that the code used is an instantaneous code, i.e. any code word is not a prefix to any other longer code word, a comma like code word is not needed to separate two code words. This will become more clear relative to the description of the decompaction of a sparse matrix representation of a given complex character relative to the decompaction hardware set forth in FIGS. 5-1 through 5-7.

Figures 2, 3, 4, 5:
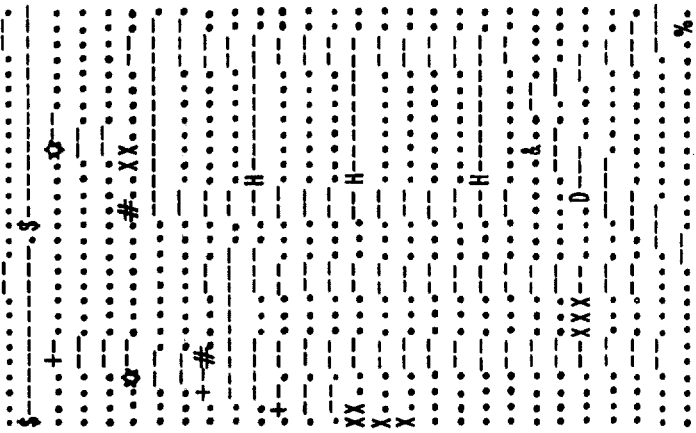

The complete Kanji character set is compacted with a computer just once, and the compacted character set is stored in a reduced storage space. The compaction method is as previously described. When a Kanji character is requested for output, the compacted data stream of the requested character is retrived, decoded, and the original Kanji character is generated in a buffer device for output. FIG. 5, is a preferred implementation to achieve the character generation from the compacted characters. The character generator is divided into four regions, in addition to the read only storage device in which the compacted characters are stored. The compacted characters are stored in a storage device 50, which for example may be a read only devices such as a magnetic disc, magnetic tape, semiconductor storage, or any other known storage device. Whenever a given character is needed for reproduction, a terminal device 52, such as an on-line typewriter or the like, request that a computer 54 retrieve the selected compacted character via line 56 from the read only storage device 50. The binary bit stream representation of the selected compacted character is provided as input data via a line 58 to a character decompacter or decoder which is illustrated generally at 60.

The four regions of the character generator are as follows:

(1) Region 1 consists of input registers 62 and 64 (FIG. 5-1) and a programmable logic array (PLA) 66 (FIG. 5-2) for decoding the "P", "S", and "Y" input data stream. A PLA latch 68 (FIG. 5-2) and a select device 70 (FIG. 5-3) are operable with the PLA array 66 for selecting the respective parameters from the array. A bit counter 72, word length counter 74, OR gates 78 and 80, and an inverter 82 (FIG. 5-2) are operative to control the shifting of data from one register to the next. A PSY decoder 76 (FIG. 5-3), AND gate 84, inverters 86 and 88 (FIG. 5-2), are operative to control the PLA latch 68 to decode the position, symbol and length parameters of patterns read from the latch 68.

(2) Region 2 consists of (Io, Jo), adders 90 and 92 (FIG. 5-3) which set the location of the non-zero elements in the sparse matrix. This location is in fact the origin of the pattern represented by this non-zero element symbol as previously explained. Io latch 94 and Jo latch 96 (FIG. 5-3) store the initial numerical representation from the adders 90 and 92 respectively. AND gates 98 and 100, and inverter 102 (FIG. 5-3) are operative with the respective adders and latches and with the decoder 76 to control the operation of this section of the character generator.

(3) Region 3 is comprised of a Q read only storage (ROS) 104 (FIG. 5-4) which contains the information to recreate the actual pattern beginning at the starting location (Io, Jo). A latch 106 stores the pattern from the Q ROS 104 as selected from a select device 108, with a Q control decoder 110 decoding the pattern stored in latch 106 (FIG. 5-4). The latch 106 is also controlled by an AND circuit 112 and an inverter 114 (FIG. 5-4).

(4) Region 4 consists of an Iy adder 116 and a Jy adder 118 (FIG. 5-5) which receive the location of the Io and Jo starting positions for a particular pattern from latches 94 and 96 respectively, with up down counters 120 and 122 (FIG. 5-5) providing successive element positions of the patterns to the adders 116 and 118 from Q control decoder 110 for computing these successive positions. The successive element positions are also provided to first inputs of comparators 124 and 126, respectively for comparison with position information stored in Iy latch 128 and Jy latch 130 (FIG. 5-5). In response to the comparators 124 and 126 sensing the same count stored in the counter 120 and latch 128, and counter 122 and latch 130 respectively complete Iy and complete Jy signals on lines 133 and 135 are provided to the Q control decoder 110 to indicate that the pattern generation is complete. AND gates 132 and 134 (FIG. 5-5) provide final position information to the latches 128 and 130 respectively from the decoder 110. A random access memory (RAM) 136 (FIG. 5-6) receives the I and J addresses via lines 138 and 140 from adders 116 and 118, respectively, and in response to receiving a write signal on line 142 from the decoder 110, the pattern information relative to successive patterns of a given character are provided to a utilization device 144 (FIG. 5-6) for manifestation thereon. The utilization device 144 may be a cathode ray tube, a printer device or the like. The printer device for example, may be a non-contact type printer such as wire printer, thermal printer, ink jet printer, ink mist printer, etc.

A more detailed description of the character generation process is described below. When a host machine 54 such as a computer or a microprocessor is ready to transmit the compacted data stream to the character generator 60, a reset signal is provided via line 146 to reset the PLA latch 68, Q ROS latch 106, Io and Jo latches 94 and 96, and Iy and Jy latches 128 and 130, as well as all of the counters in the circuit. The various devices in the circuit may also be reset manually.

The output lines of the PLA latch 68 are arranged in four groups. Two for "look ahead feed back" lines, three for "PSY" control lines, ten for data lines and finally four for the "input counter" lines.

Figures 2, 3, 4, 5, 6:
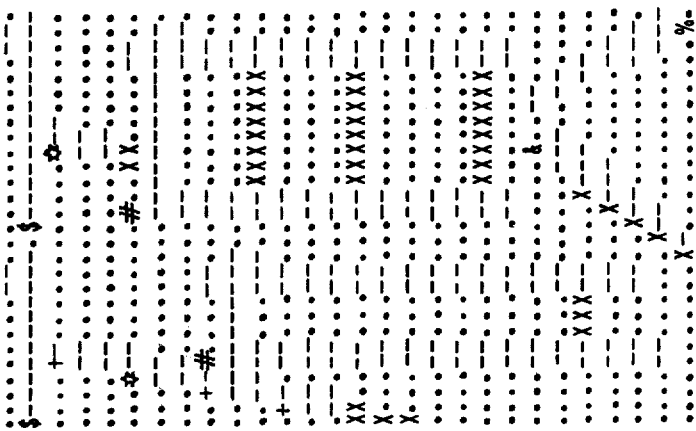

The total of 19 lines have a data representation as set forth in the output PLA table, as illustrated in FIG. 6. At system start up or reset time, the PLA latch 68 is reset to 0, and thus the output lines are as indicated in the first row of FIG. 6. The look ahead feed back lines are a 2 bit word of "FB=00". This means that the next input bit stream when decoded is a "P". Since a code word "P", "S" or "Y" may be any length from 3 bits to a maximum of 12 bits, decoding is accomplished only when the 12 bit input shift register 64 is full. Thus the PLA latch 68 is controlled by the word length counter 74 in the following manner. At reset time, the input bit counter 72 is set to 0, and also the word length counter 74 is preset at a value "1100=12" by the input counter lines as shown in FIG. 6. Whenever the input bit counter 72 is at a 0 count, a "load data" signal is provided on line 48 to the computer 54, indicating that the character generator 60 is ready to accept one byte of data. The computer 54 sends a byte of data in parallel via the 8 line data bus 58, and loads the 8 input data register 62. At the same time the computer 54 generates a "data loaded" signal on a line 150 to the character generator 60 and the input bit counter 72 is preset to a value of 8. The input bit counter 72 counts down from 8 to 0 as the 8 bit shift register 62 transfers the data to the 12 bit shift register 64. When the input bit counter 72 is at a 0 count, the transfer of one byte of data is complete. Since the word length counter 74 is counting down synchronized with the input bit counter 72, at this point of time, the word length counter 74 has counted down to a count of 4 indicating another 4 bits of data are required to fill up the 12 bit register 64. The 8 bit register 62 is ready to receive another byte of data from the computer 54 at this time. As the next 4 bits of data are shifted into the 12 bit shift register 64, the word length counter 74 counts down to 0. At this time the PLA array 66 output is transferred to the PLA latch 68. The code word just decoded is a "P", because the feed back (FB) on line 152 from the select device 70 to the PLA array 66 is "00", thus the next state of the PLA latch 68 contains data on "P". This indicates that the output of the PLA latch 68 is as in one of the three rows, the second through the fourth of the table in FIG. 6. If it is the type of row 2, the output means the following.

(a) The look ahead feed back "FB=01" means that the next input bit stream when decoded is an "S".

(b) The control word =001 means that the nature of this "P" is of the type A as set forth earlier. To reiterate, the location of the type A non-zero element can be specified by the relative distance of "I" with respect to the previous element. Being on the same column of the sparse matrix, this element does not change its "J" value. The function of this control word will be set forth in more detail later.

(c) The first six bits of the 10 data line represents the dI value to be added to the previous I value which is already stored in Io latch 94.

(d) The last four bits set forth the length of the code word for the current "P" value. If the code word for the "P" is the first five bits of the 12 bit input register 64, the next code word will start from the sixth bit. Therefore the five bits already used must be shifted from the 12 bit shift register 64. This is accomplished by presetting the word length counter 74 at the value of 5 and counting down to 0. During this process, the 12 bit shift register 64 shifts out five bits, and at the same time the same number of bits will be supplied by the 8 bit shift register 62. Remember that whenever the 8 bit shift register 62 is empty, the input bit counter 72 is at a count of 0, and a new byte of data is supplied to the 8 bit shift register 62 from the computer 54.

If the output from the PLA latch 68 is the type shown in the third row of FIG. 6, "FB=00" this means that the next code word in the input register 64 is a "P" again. "Control=010" means that the non-zero element is of the type B. Namely, the four bit represented by the "J" in the data field should be added to the previous "J" with the Jo adder 92 and stored in the Jo latch 96. The "I" coordinate is no longer referring to the previous value. The new "I" value represented by 6 bits in the data field will replace the previous value in the Io latch 94. The meaning of the count preset is the same as before, namely, presetting the word length counter 74 with the length of the word just encoded.

A similar statement can be made for the other row in FIG. 6 as follows.

| Feed back | Comment |
|---|---|
| 00 | Next code word will be 'P'. |
| 01 | Next code word will be 'S'. |
| 10 | Next code word will be 'Y'. |

| Control | Comment |
|---|---|
| 000 | Reset all latches and counters. |
| 001 | Add the 'dI' value which is the first 6 bits in the data field to the previous I value which is ready in the Io latch 94. In order to accomplish this, the signal from the PSY decoder 76 will cause the content of the Io latch 94 to feedback to the input of the Io adder 90. The new sum will then be stored in the Io latch 94. |
| 010 | Replace the previous I value in the Io latch 94 with the current value of 'I' which is the first 6 bits of the data field. In order to accomplish this, the signal from the PSY decoder 76 will prevent the content of the Io latch 94 to feedback to the input of the Io adder 90, when the Io latch is enabled by disabling AND gate 100 via line 101. At the same time, this control word is to add the 'dJ' value which is the last 4 bits in the data field to the previous J value in the Jo latch 96. |
| 011 | The content of the data field is the address of the starting location of pattern Qi in the Q ROS 104. Q ROS 104 contains instructions to write pattern Qi, i = 1, N which are represented by the N symbols. This control word also implies that the present pattern is fixed in size and requires no size parameter. |
| 100 | The content of the data field is the address of the starting location of pattern Q (3y) in the Q ROS 104. This control word implies that this pattern has 3 size parameters and their code words are concatinated in the next input bit stream. |
| 101 | The content of the data field is the address of the starting location of pattern Q(2y) in the Q ROS 104. This control word implies that this pattern has 2 size parameters and their code words are concatinated in the next input bit stream. |
| 110 | The content of the data field is the address of the starting location of pattern Q(1y) in the Q ROS 104. This code word implies |

-continued

| |
|---|
| that this pattern has one size parameter, and the code word is in the next input bit stream. |

Figures 2, 3, 4, 5, 6, 7:
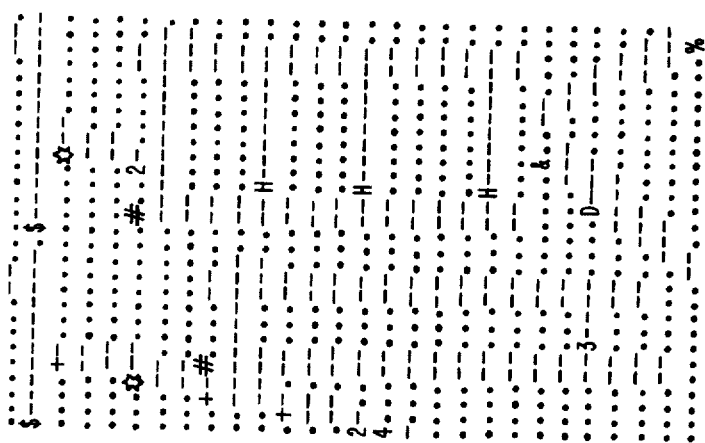
Figures 1, 3:
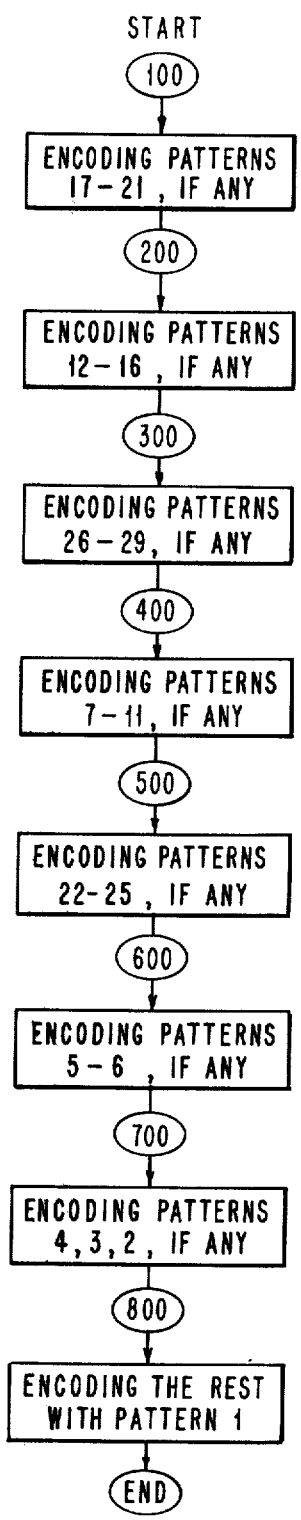
Figures 2, 3:
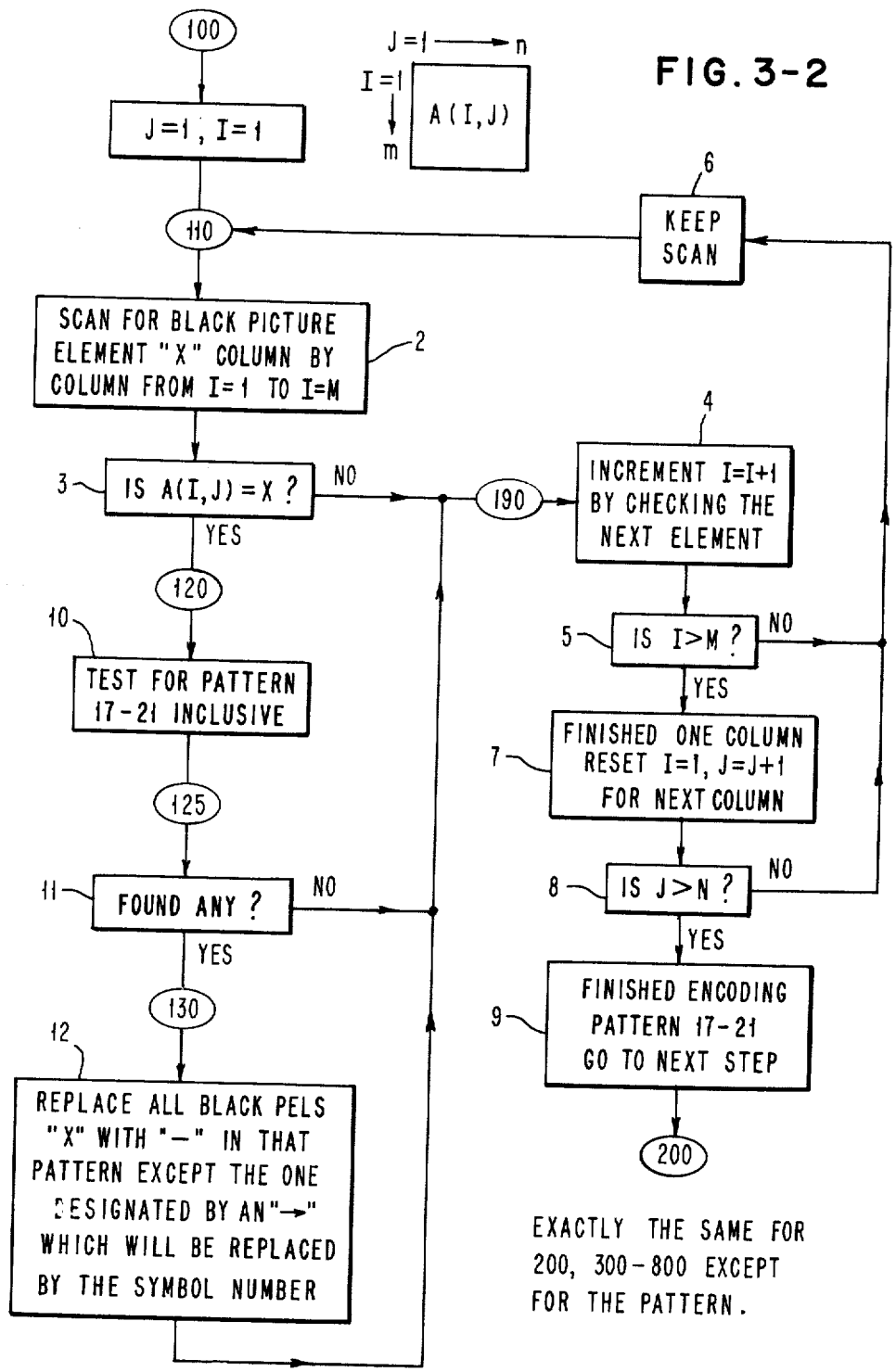
Figures 3, 4:
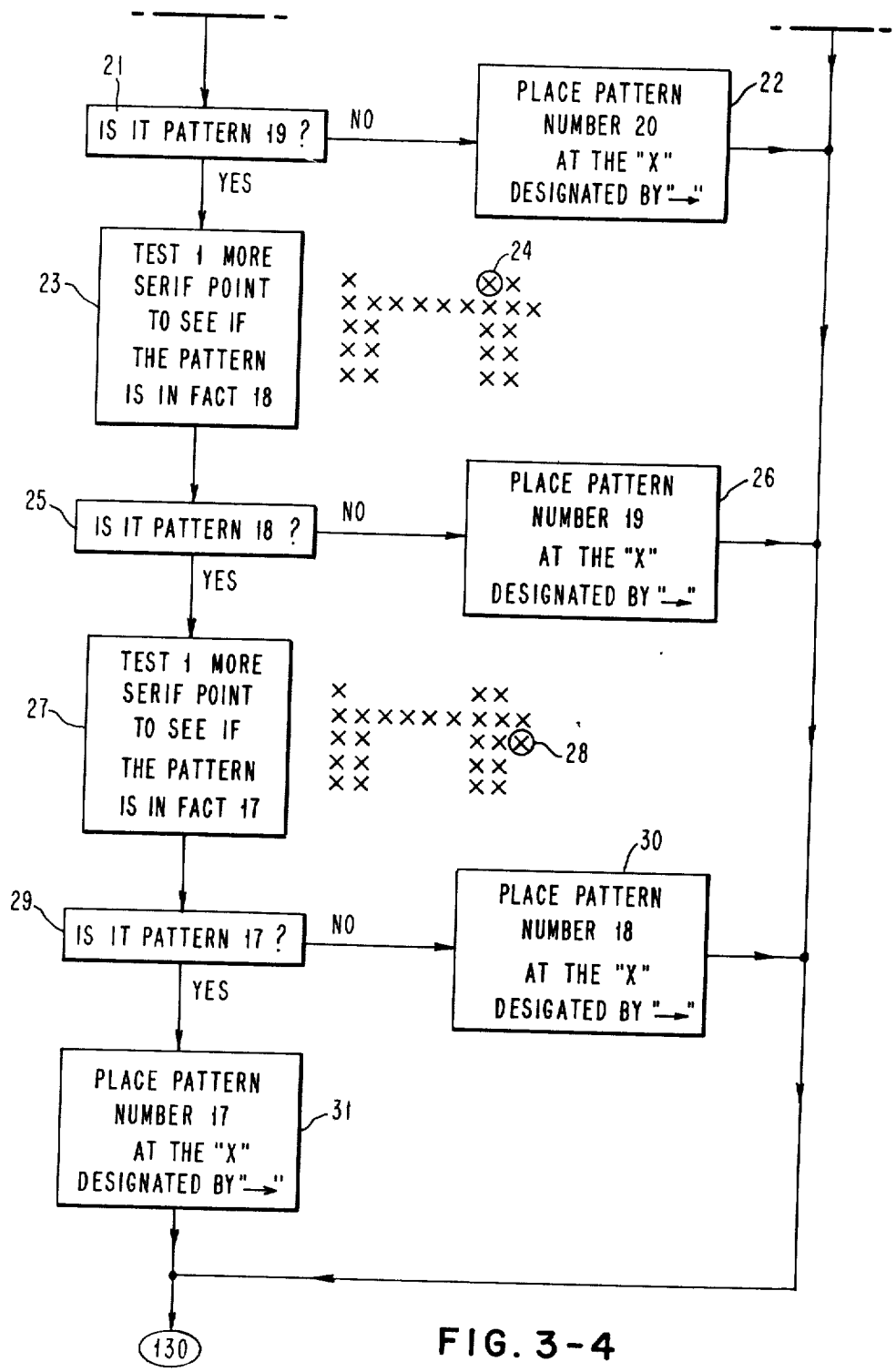
Figures 1, 4:
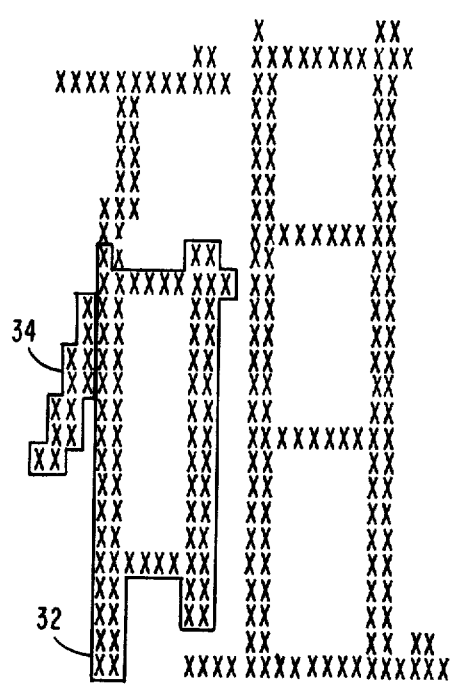
Figures 2, 4:
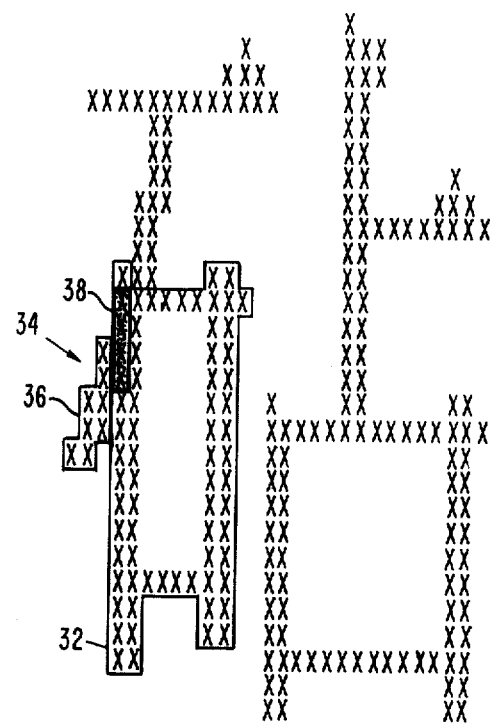
Figures 3, 4:
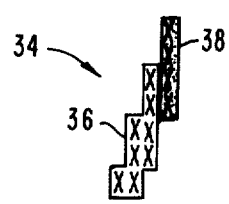
Figure 4:
Figures 4, 5:
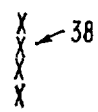
Figures 1, 5:
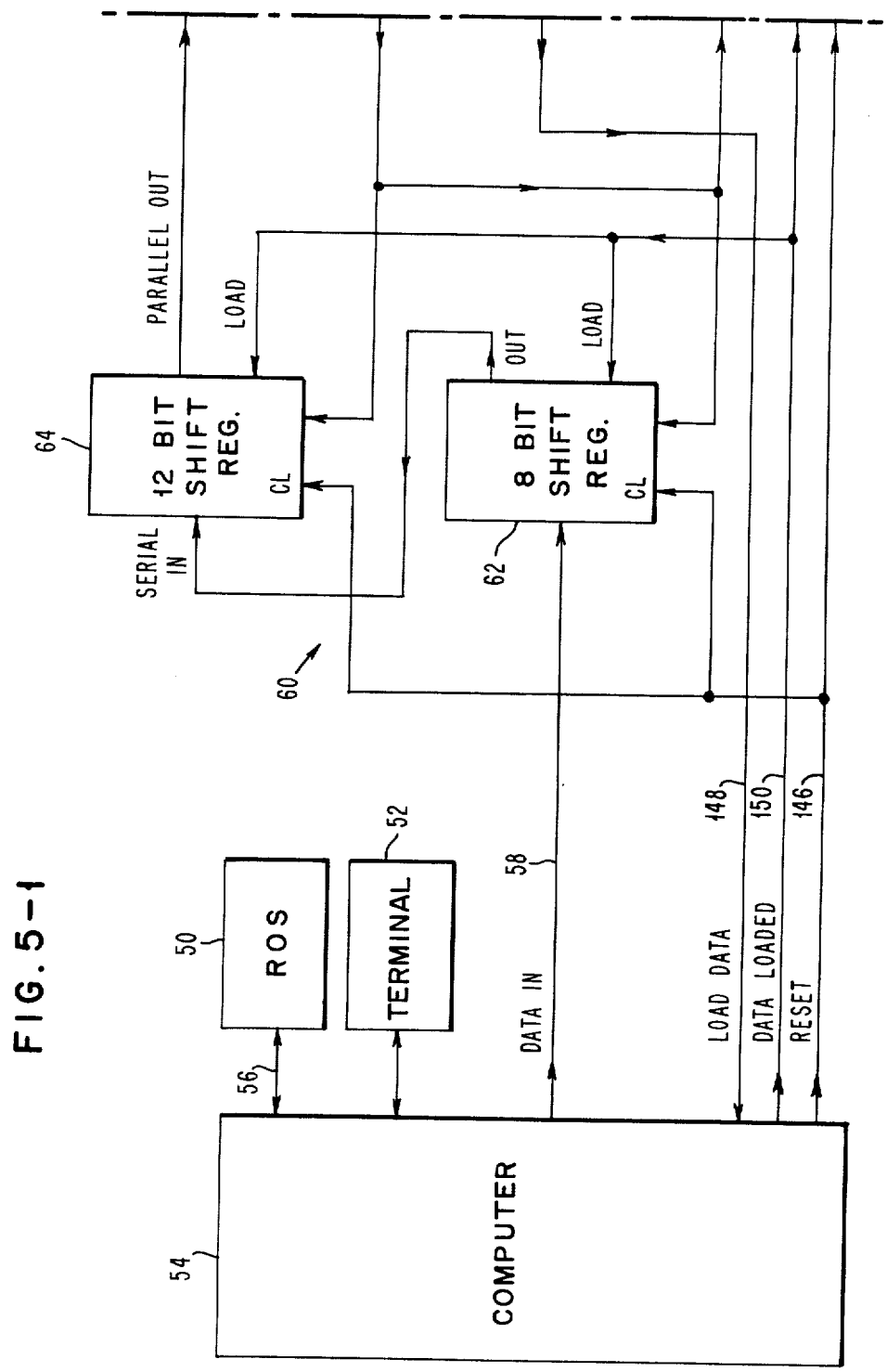
Figures 2, 5:
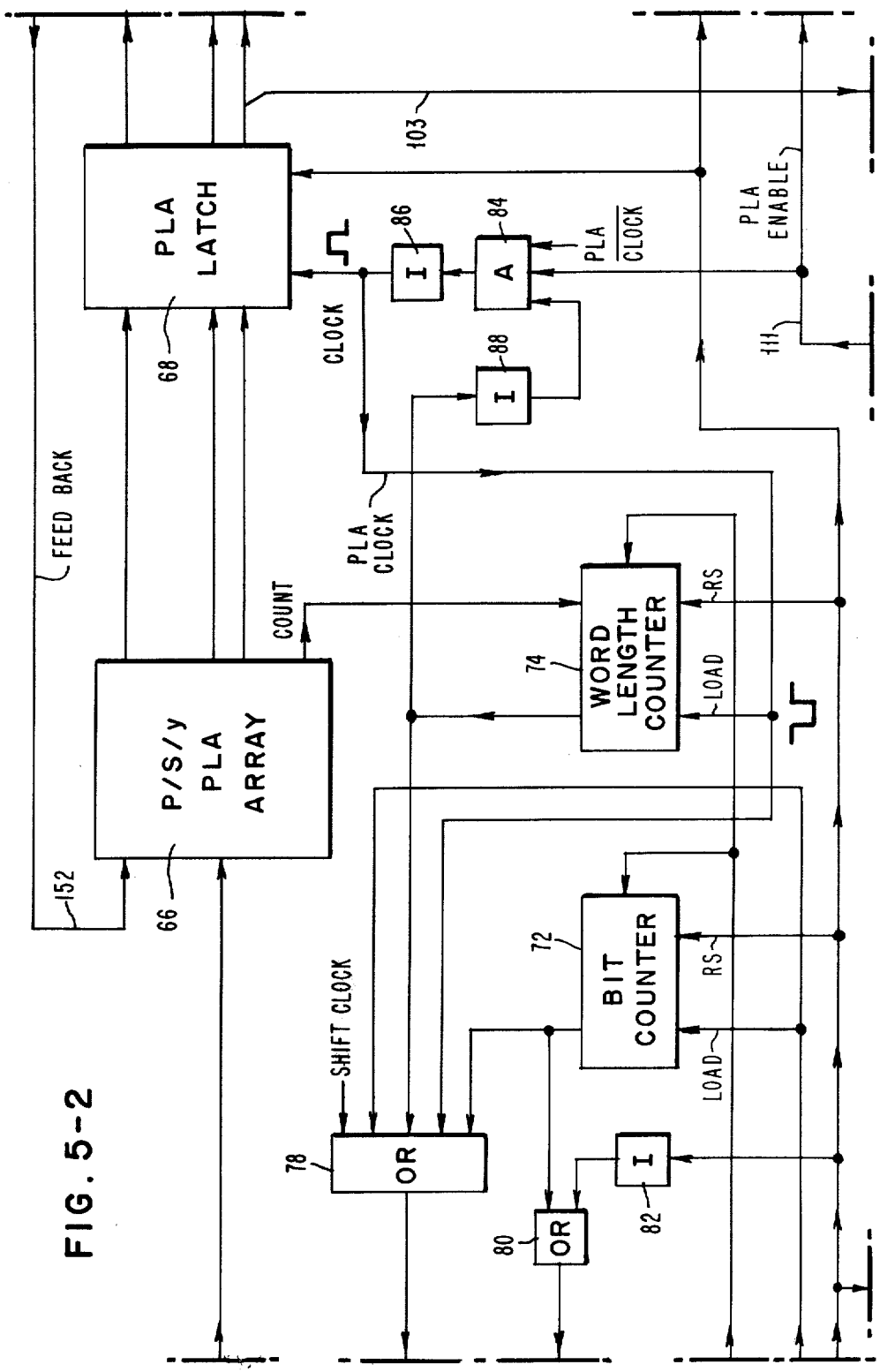
Figures 3, 5:
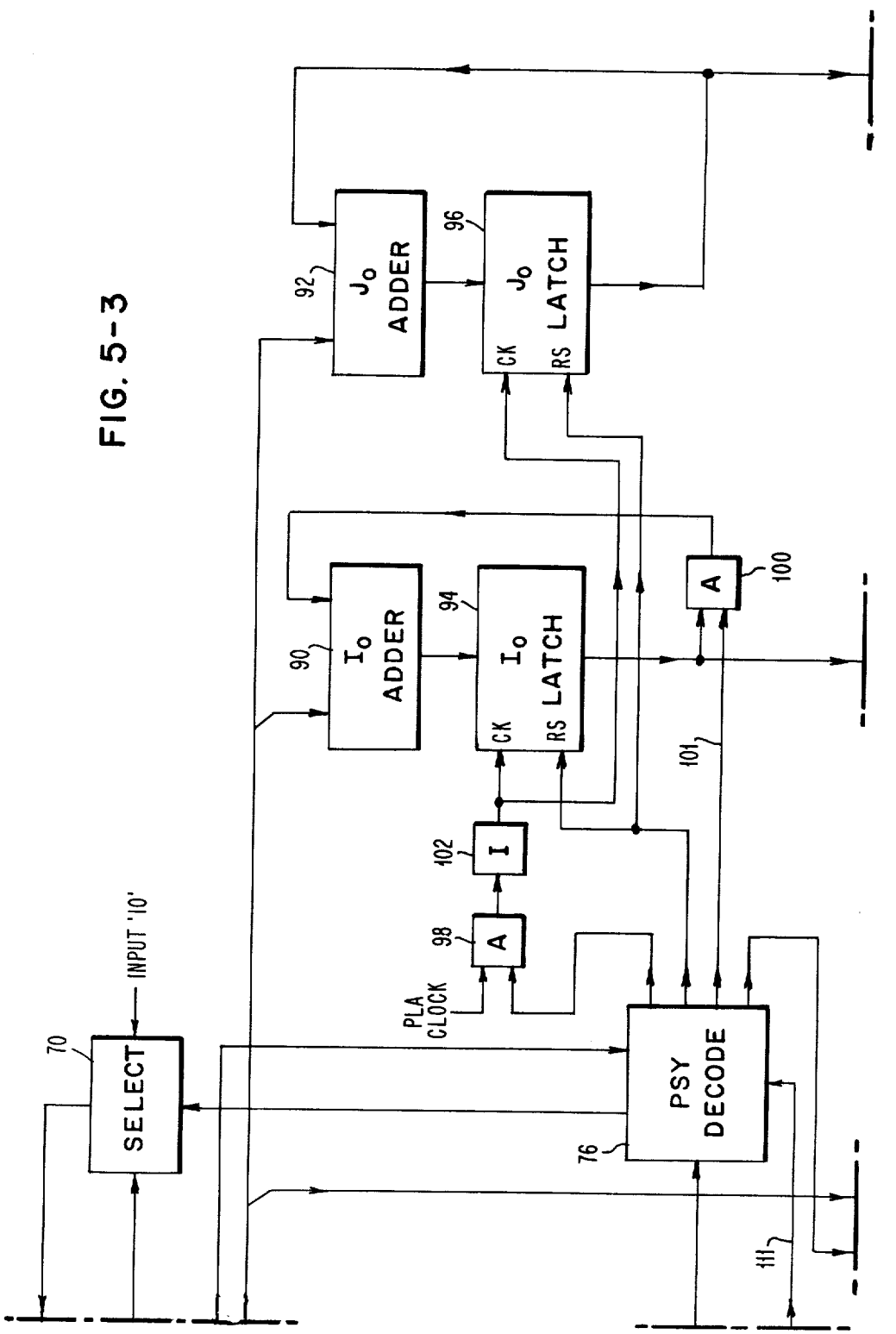
Figures 4, 5:
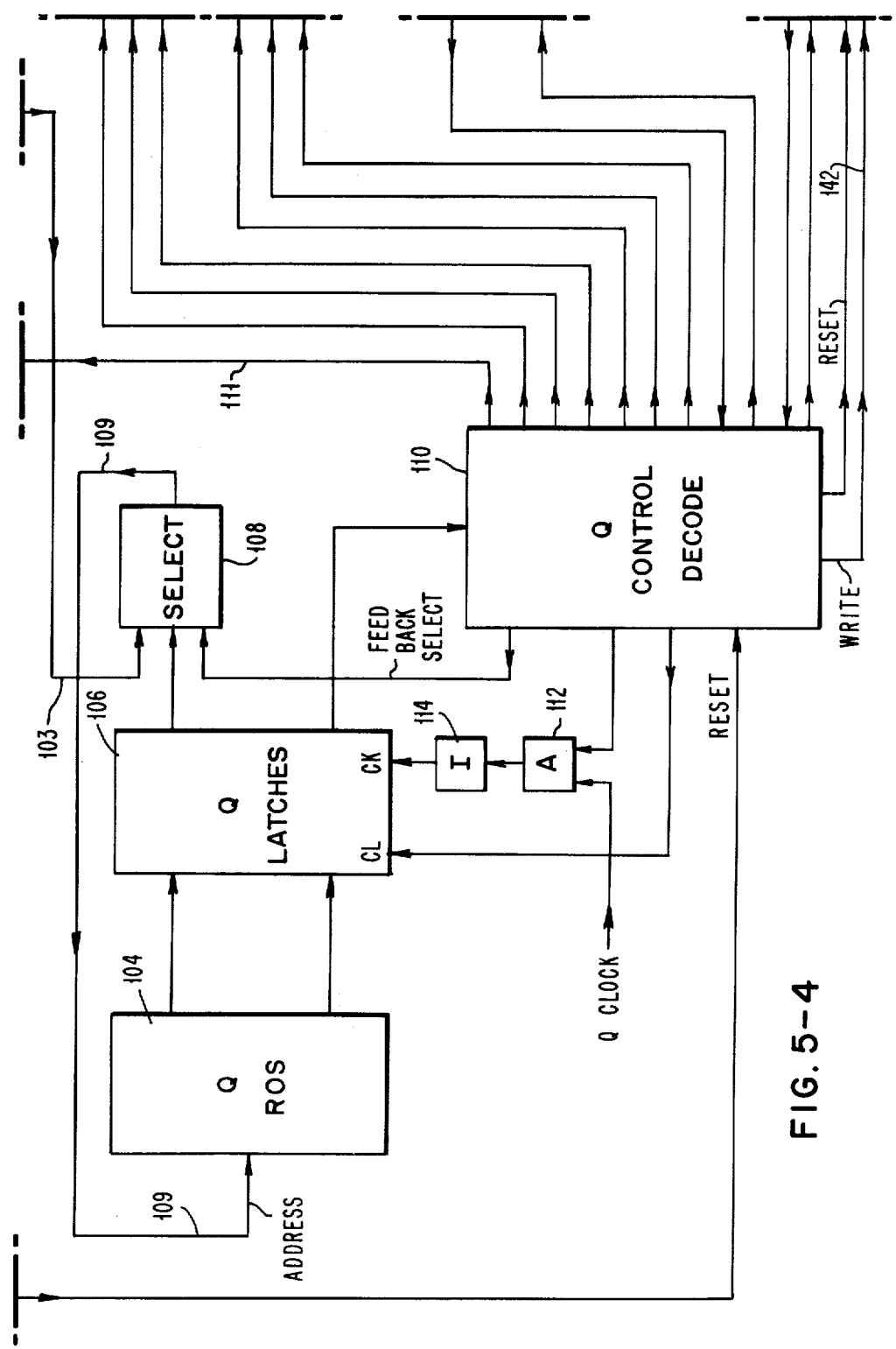

Thus far, the decoding and the output function of the PLA 68 has been explained. The explanation of the content of the Q ROS follows. The Q ROS 104 contains two fields, the feedback address field and the control field. The feedback address field contains the address of the next location which will be accessed in the Q ROS 104. The control field contains 12 control bits to control the Iy and Jy counters 120 and 122, respectively, and latches 128 and 130 to write a pel on the utilization device 144. FIG. 7 is a part of the Q ROS which provides the instruction to write a pattern represented by the symbol "20". The pattern "20" is illustrated in FIG. 1.

The abbreviations used in the header of FIG. 7 are explained in the following.

PTR: Pointer pointing at a Q ROS 104 location. Q20,1 stands for the address of the first location of pattern 20. This column does not physically occupy the Q ROS. Note that the address Q20,1 is obtained at the output data field of the PLA 68, when 'S=20' is decoded.

ADD: The address of the next location to be accessed. This column physically occupies the feedback address field of the Q ROS 104.

The 12 control bits are abbreviated as follows.
HCP: Hold Q latch 106 until counter 120 or 122 equals Iy/Jy latch 128 or 130.
EIL: Enable Iy latch 128.
EJL: Enable Jy latch 130.
EIC: Enable Iy counter 120.
EJC: Enable Jy counter 122.
HQL: Hold Q latch 106 until PLA control enable on line 111.
WRT: Write a pel in the RAM 136, if '1'.
RIC: Reset the Iy U/D counter 120, if '1'.
RJC: Reset the Jy U/D counter 122, if '1'.
UDI or UDJ: Count up if '0', down if '1'.
HPL: Hold PLA latch clock, if '1'.

Assume that the character generator 60 is started up from reset or just finished writing one pattern and is going on for the next pattern 20. At time t=t0, the 12 bit input register 64 is filled and the first 7 bits are decoded as a code word for location (Io,Jo) of the pattern 20.

At t=t1:

Upon application of a clock pulse (t=t1, pulse 1), the output of the PLA latch 68 is latched on to the output lines. The data is as follows:

| Function | Fb | control | data | count preset |
|---|---|---|---|---|
| t1 P add I → S | 01 | 001 | I = 3 J = 5 | used 7 bits |

I and J are presented respectively at the Io and Jo adder 90 and 92 inputs, so that the new values are added to the previous Io,Jo values. The Io, Jo latches 94 and 96, respectively are enabled. At the next clock (t2) the sum will be transferred to the output of the latches.

The latch for the Q ROS 104 remain disabled. The look ahead feedback 'FB=01' is now presented to the input of the PLA array 66 on line 152, indicating next bit stream contains the 'S' code word. The 7 bits in the column of 'preset count' (FIG. 7) is used to preset the 4 bit down counter to 7. This is the length of the code word for 'P' which was just decoded. The input shift register is advanced by 7 bits and the new data is requested from the computer 54 as needed.

At t=t2:

The output of the PLA latch 68 is now

| Function | FB | control | data | count preset |
|---|---|---|---|---|
| t2 s → 3Y | 10 | 100 | Q address | used 5 bits |

At this instant, the code word for 'S' is obtained, and the 'FB=10' indicates that the next incoming code word will be a Y value. The data field is the address of the first location of pattern Q20, and is designated as Q20,1. This data will be presented at the input of the Q ROS 104 via the Q ROS feedback selector 108 on line 109.

The control word '100' is presented at the PSY decoder 76. It will set the Y counter in the PSY decoder at a value 3. This will allow PLA feedback selector 70 to repeat decoding of the Y value two more times, as this Y counter counts down to one. This process is needed, because the present pattern has three size parameters.

At the same time the PSY decoder 76 will also enable the Q ROS latch 106, so that at the next clock (t3), the content of the first location of Q20 will be transferred to the output of the Q ROS latch. The value 5 in the count preset column will again cause the input to advance 5 bits.

At t=t3:

| Function | FB | control | data | count preset |
|---|---|---|---|---|
| t3 Y → Y | 10 | 111 | Y value | used 3 bits |

The PLA feedback on line 152 is held at 'FB=10' by the Y counter in the PSY decoder 76. The Y counter is decremented to a value of 2. The data is the first size parameter, which is presented to both the Iy and Jy latches 128 and 130. The control word '111' disables the PLA latch 68 until the Y value is used, under the control of Q ROS 104.

At the same time (t=t3) the output of the Q ROS 104 is transferred to the Q ROS latch 106. The output of the Q control decoder 110 accomplishes the following:

Enable the Iy latch 128 so that at the next clock (t=t4) the Y value will appear at the Iy comparator 124 input.

Set the Iy counter 120 to count up from zero value.

Enable Iy counter 120 to increment on the next clock (t=t4).

Output command to write a spot at (Io,Jo).

Enable the PLA latch 68 to transfer the 2nd Y value to its output at the next clock (t=t4).

At t=4:

The output of the PLA latch 68 is as follows:

| Function | FB | control | data | count preset |
|---|---|---|---|---|
| t4 Y → Y | 10 | 111 | Y value | used 5 bits |

The PLA feedback on line 152 is held at 'FB=10' by the Y counter in the PSY decoder 76. The Y counter is decremented to a value of 1. The data is the 2nd size parameter, which is presented to both the Iy and Jy latches 128 and 130, respectively. The control word '111' will disable the PLA latch 68 until the 2nd Y value is used, under the control of the Q ROS 104.

The output of the Q control decoder accomplishes the following:

Disable the Q ROS latch 106 via AND gate 112 and inverter 114 until the comparator 124 indicates that:

The output of the Iy counter 120 is equal to the first y value at the output of the Iy latch 128.

Set the Iy counter 120 to count up.

Enable Iy counter 120 to increment on the next clock.

Output command to write a spot at (Io+1,Jo).

At t=t5,t6,t7:

PLA latch 68 remains disabled.

Q latch 106 remain disabled.

The output of the Q decoder 110 stays the same.

The Iy counter 120 is incremented and the output command to write a spot at each clock i.e. (Io+2,jo) at t=t5, (Io+3,Jo) at t=t6, etc. until the (Io+y1,Jo) is completed. In this example, y1=4 and (I=io+4,Jo) at t=t7.

The comparator 124 enables the Q ROS latch 110 via line 133 at t=t7, when the Iy counter 120 output is equal to the Y1 value in latch 128, (Y1=4 in this example).

At t=t8:

The output of the Q decoder 110 changes and accomplishes the following.

Reset the Iy counter 120.

Set the Jy counter 122 to count up from zero value.

Enable the Jy counter 122 to increment on the next clock.

At t=t9:

The output of the Q decoder 110 accomplishes the following.

Disable the Q ROS latch 106 until the comparator 124 indicates that the output of the Iy counter 120 is equal to the Y1 value at the output of the Iy latch 128.

Set the Iy counter 120 to count up.

Enable Iy counter 120 to increment on the next clock.

Output command to write a spot at (Io,Jo+1).

At t=t10,t11,t12,t13:

PLA latch 68 remains disabled.

Q latch 104 remains disabled.

The output of the Q decoder 110 stays the same.

The Iy counter 120 is incremented and output command to write a spot at each clock i.e. (Io+1,jo+1) at t=t10, (Io+2,Jo+1) at t=t11, etc. until the (Io+y1,Jo+1) is completed. In this example y1=4 and (I=io+4,Jo+1) at t=t1.

The comparator 124 on line 133 enables the Q ROS latch 106 at t=t13, when Iy counter 120 output is equal to the Y1 value in latch 128 (Y1=4 in this example).

At t=t14:

The output of the Q decoder 110 changes and accomplishes the following.

Reset the Iy counter 120.

Set the Jy counter 122 to count up from zero value.

Enable the Jy counter 122 to increment on the next clock.

Enable the Jy latch 130 so that at the next clock (t=t15) the Y2 value will appear at the Jy comparator 126 input.

Enable the PLA latch 68 to transfer the 3rd Y value (Y3) to its output at the next clock (t=t15).

At t=t15:

The output of the PLA latch 68 is as follows:

| Function | FB | control | data | count preset |
|---|---|---|---|---|
| t15 Y → P | 00 | 111 | Y value | used 4 bits |

The Y counter in the PSY decoder 76, is decremented to a value of 0. Thus the PLA feedback selector 70 will simply feed the PLA latch output back on line 152, which is 'FB=00' in this case.

The data is the 3rd size parameter (Y3), which is presented to both the Iy and Jy latches 128 and 130, respectively.

The control word '111' will disable the PLA latch 68 until the 3rd Y value, Y3, is used, under the control of Q ROS 104.

At the same time (t=t15) the output of the Q ROS 104 is transferred to the Q ROS latch 106. The output of the Q control decoder 110 accomplishes the following:

Set the Jy counter to count up.

Enable the Jy counter 122 to increment on the next clock.

Disable the Q ROS latch 106 until the comparator 126 indicates on line 135 that the output of the JY counter 122 is equal to the Y2 value at the output of the Jy latch 130.

Output a command to write a spot at (I0,J+2)

At t=t16,t17,t18:

PLA latch 68 remains disabled.

Q latch 106 remains disabled.

The output of the Q decoder 110 stays the same.

The Jy counter 122 is incremented and output command to write a spot at each clock i.e. (Io,jo+3) at t=t16, (Io,J0+4) at t=t17, etc. until the (Io,Jo+Y2) is completed. In this example, Y2=5 and (I=io,Jo+5) at t=t18.

The comparator 126 enables the Q ROS latch 110 via line 135 at T=t18, when jy counter 122 output is equal to the Y2 value (Y2=5 in this example).

At t=t19:

The output of the Q decoder 110 changes and does the following.

PLA latch 68 remains disabled.

Set the Iy counter 120 to count up from zero value.

Enable the Iy counter 120 to increment on the next clock.

Enable the Iy latch 128 so that at the next clock (t=t20) the Y3 value will appear at the Iy comparator 124 input.

Output a command to write a spot at (Io,Jo+6).

At t=20,21:

The output of the Q control decoder 110 accomplishes the following:

PLA latch 68 remains disabled.

Disable the Q ROS latch 106 until the comparator 124 indicates that the output of the Iy counter 120 is equal to the 3rd y value, Y3, at the output of the Iy latch 128.

Set the Iy counter 120 to count up.

Enable Iy counter 120 to increment on the next clock.

Output command to write a spot.

The Iy counter 120 is incremented and an output command is given to write a spot at each clock i.e. (Io+1,jo+6) at t=t20, (Io+2,Jo+6) at t=t21, etc. until (Io+y3,Jo+6) is completed. In this example, y3=2 and (I=io+2,Jo+6) at t=t21. The comparator 124 enables the Q ROS latch 110 at t=21, when Iy counter 120 output is equal to the Y3 value from latch 128, (Y3=2 in this example).

At T=t22:

The output of the Q decoder 110 changes and accomplishes the following.

Reset the Iy counter 120.

Set the Jy counter 122 to count up.

Enable the Jy counter 122 to increment on the next clock.

At t=t23,t24,t25:

The output of the Q decoder 110 accomplishes the following.

Disable the Q ROS latch 106 until the comparator 124 indicates that the output of the Iy counter 120 is equal to the Y3 value at the output of the Iy latch 128.

Set the Iy counter 120 to count up.

Enable Iy counter 120 to increment on the clock.

Output command to write a spot.

The Iy counter 120 is incremented and an output command is given to write a spot at each clock i.e. (Io,Jo+7) at t=t23, (Io+1,Jo+7) at t=t24, etc. until the (Io+3,Jo+7) is completed. In this example, y3=2 and (I=Io+2,Jo+7) at t=t25.

The comparator 124 enables the Q ROS latch 106 at t=21, when Iy counter 120 output is equal to the Y3 value (Y3=2 in this example).

At t=t26:

Enable the PLA latch 68 to transfer the new P value to its output at the next clock.

Reset the Iy and Jy counters 120 and 122, respectively.

Diable the Q ROS latch 106.

Set the Q ROS feedback address selector 108 to accept the data on line 103 from the PLA latch 68 output.

At t=t27:

The output of the PLA latch 68 now provides the location of the new non-zero element in the sparse matrix, and the operation of writing the next pattern repeats.

The procedures similar to the above continue until one complete Kanji character is reconstructed.

The following three factors determine the speed of the character generation. (1) Loading input data into the input shift registers 62 and 64, (2) decoding with the PLA array 66, and (3) operating the Q ROS 104. In the circuit diagram of FIG. 5, one may notice that the above named three devices can have independent clocks. The clocks though synchronized can be operated at different speeds as follows:

(1) Loading Input: Let the original dot matrix size be M X N pels, the compaction ratio R, and the clocking period Ti. Then the time required to load a compacted character is (MN/R)Ti.

Comment: (i) If the clock of the input shift registers 62 and 64 is much faster than the clock for the PLA latch 68, the time for loading the input is negligible.

(ii) Even with the same clock, if the computer 54 is a 16 bit machine, a 16 bit register should be used for input and the input shift time can be reduced to one half.

(iii) Note that the input loading time decreases as the compaction ratio increases. This is obvious, since the higher the compaction ratio, the number of bits in a compacted character are given, and therefore, it takes less time to load the input shift register.

(2) PLA Latch 68 Decoding Time: Let the average numer of bits per code word be W, and the logic dalay time for the PLA is Ta, then the time for decoding one compacted character is (MN/RW)Ta.

Comments: Again the higher the compaction ratio, the less the time is required for the PLA to decode the input.

(3) The Time for Operating the Q ROS 104: Accurate estimation can be accomplished only on the actual Q ROS for each particular Kanji character. However, an approximation is that the time required to operate the Q ROS is proportional to the number of black picture elements to be written in the RAM 136. Let the average fraction that the black pels occupy in a Kanji character be F, and the period of the Q ROS 104 clock be Tg, then the time required for writing a Kanji character into the RAM 136 is MNFTq.

The maximum time required to generate a Kanji character is the sum of the aforementioned three terms. However, the actual time required to generate one character is less than this value for the following reasons.

When the Q ROS 104 is operating and bits are written into the buffer, the PLA latch 68 may be held, but the input shift clock is not held. This, the input bits can be shifted into the 12 bit register 64 while the Q ROS 104 is writing. The operation is in parallel, thus the input shift time can be neglected in the above sum.

In the first row of the FIG. 7, it may be noted that the Q ROS 104 is writing a bit on the RAM 136 at the same time the first Y value is decoded. In the last row of the FIG. 7 while the Q ROS 104 is resetting the IY or Jy latch 128 and 130, respectively, the next P value is decoded at the same time. In other words, some operations are performed in parallel and the time of decoding takes place at the same time the Q ROS 104 is writing. Most of the time is consumed in the Q ROS 104 operation, which is proportional to the number of black pels in the Kanji character.

It is seen, that any of the patterns forming any of the compacted complex characters stored in the ROS 50 may be decompacted and generated by the network 60 in a manner similar to that set forth above for pattern 20.

Industrial Applicability

It is an object of the invention to provide an improved complex character generator.

It is another object of the invention to provide an improved complex character generator wherein the complex characters are Kanji characters.

It is yet another object of the invention to provide an improved complex character generator, wherein the complex characters are defined in terms of elements found in three groups of different patterns which occur frequently in complex character set, namely, a first group which has a fixed size for each pattern, a second group which has one size parameter which must be specified for each pattern, and a third group which has a plurality of size parameters which must be specified for each pattern.

It is still another object of the invention to provide an improved complex character generator, wherein the complex characters are defined in terms of elements which are in three groups of different patterns which occur frequently in the complex character set, namely, a first group which has a fixed size for each pattern, a second group which has one size parameter which must be specified for each pattern, and a third group which has a plurality of size parameters which must be specified for each pattern, with at least certain ones of the characters having elements of different patterns which overlap, such that these characters may be encoded utilizing fewer bytes of imformation.

It is a further object of the invention to provide an improved complex character generator in which a given decoded pattern may be generated simultaneously with another pattern being decoded.

Having thus described our invention, what we claim as new, and desire to secure by Letters Patent is:

1. In character generating apparatus, a method of generating characters in a complex character set on a utilization device, with each character in said complex character set being described by an original m by n element matrix, where m and n are integers which may or may not be equal, said method comprising the steps of:

defining in terms of elements, three groups of different patterns which occur frequently in said complex character set, namely, a first group which has a fixed size for each pattern, a second group which has one size parameter which must be specified for each pattern, and a third group which has a plurality of size parameters which must be specified for each pattern;

assigning a different symbol to represent each one of said different patterns;

defining a sparse m by n character matrix for each character in said complex character set in terms of the combination of symbols assigned to represent the combination of patterns defining the corresponding original character matrix, with at least certain ones of said characters having elements of different patterns which overlap, such that the elements that overlap are generated for each pattern of which they form a part, with each symbol being positioned in the sparse matrix where a predetermined one of the elements forming the pattern defined by that symbol is positioned in the original character matrix;

storing in binary form in a storage device each sparse matrix representation in said complex character set as a compacted character, with the binary information stored for each compacted character being: (a) the symbols in the sparse matrix, (b) the positions of the symbols in the sparse matrix, and (c) the size parameters of the pattern represented by the symbol, if the symbol is in said second or third group of patterns; and generating on said utilization device a given complex character in response to retrieving and decoding the binary information stored which defines the corresponding compacted complex character, with the elements that overlap patterns being generated for each pattern of which they form a part.

2. The combination claimed in claim 1 wherein said generating on said utilization device a given complex character is accomplished by generating a given pattern simultaneously with a different pattern being decoded.

3. In character generating apparatus, a method of generating characters in a Kanji character set on a utilization device, with each character in said Kanji character set being described by an original m by n element matrix, where m and n are integers which may or may not be equal, said method comprising the steps of:

defining in terms of elements, three groups of different patterns which occur frequently in said Kanji character set, namely, a first group which has a fixed size for each pattern, a second group which has one size parameter which must be specified for each pattern, and a third group which has a plurality of size parameters which must be specified for each pattern;

assigning a different symbol to represent each one of said different patterns;

defining a sparse m by n character matrix for each character in said Kanji character set in terms of the combination of symbols assigned to represent the combination of patterns defining the corresponding original character matrix, with at least certain ones of said characters having elements of different patterns which overlap, such that the elements that overlap are generated for each pattern of which they form a part, with each symbol being positioned in the sparse matrix where a predetermined one of the elements forming the pattern defined by the symbol is positioned in the original character matrix;

storing in binary form in a storage device each sparse matrix representation in said Kanji character set as a compacted character, with the binary information stored for each compacted character being: (a) the symbols in the sparse matrix, (b) the positions of the symbols in the sparse matrix, and (c) the size parameters of the pattern represented by the symbol, if the symbol is in said second or third group of patterns; and generating on said utilization device a given Kanji character in response to retrieving and decoding the information stored which defines the corresponding compacted Kanji character, with the elements that overlap patterns being generated for each pattern of which they form a part, and for a given Kanji character, one pattern being decoded while another pattern is being generated on said utilization device.

4. In character generating apparatus, a method of generating characters in a complex character set on a utilization device, with each character in said complex character set being described by an original m by n elements matrix, where m and n are integers which may or may not be equal, said method comprising the steps of:

defining in terms of elements, three groups of different patterns which occur frequently in said complex character set, namely, a first group which has a fixed size for each pattern, a second group which has one size parameter which must be specified for each pattern, and a third group which has a plurality of size parameters which must be specified for each pattern;

assigning a different symbol to represent each of said different patterns;

defining a sparse m by n character matrix for each character in said complex character set in terms of the combination of symbols assigned to represent the combination of patterns defining the corresponding original character matrix, with at least certain ones of said characters having elements of different patterns which overlap, with the elements that overlap patterns being generated for each pattern of which they form a part, with each symbol being positioned in the sparse matrix where a predetermined one of the elements forming the pattern defined by that symbol is positioned in the original character matrix;

storing in binary form in a read only storage device each sparse matrix representation in said complex character set as a compacted character, with the information stored for each compacted character being: (a) the symbols in the sparse matrix, (b) the positions of the symbols in the sparse matrix, and (c) the size parameters of the pattern represented by the symbol, if the symbol is in said second or third group of patterns;

storing in a memory device information needed to generate each of said different patterns contained in said three groups of patterns;

storing information relative to all of the different symbols, all of the positions in the sparse matrix, and all of the size parameters specified for the patterns in said second and third groups of patterns, in a programmed logic array, retrieving from said read only storage device, the information stored which defines a given compacted character; and responding to the retrieved information relative to said given compacted character by the information stored in said programmed logic array and the information stored in said memory device to generate each of said different patterns for generating the original character corresponding to said compacted character, with the element that overlap patterns being generated for each pattern of which they form a part.

5. A method of compacting characters in a complex character set, with each character in said complex character set being described by an original m by n element matrix, where m and n are integers which may or may not be equal, said method comprising the steps of:

defining in terms of elements, three groups of different patterns which occur frequently in said complex character set, namely a first group which has a fixed size for each pattern, a second group which has one size parameter which must be specified for each pattern, and a third group which has a plurality of size parameters which must be specified for each pattern;

assigning a different symbol to represent each one of said different patterns;

defining a sparse m by n character matrix for each character in said complex character set in terms of the combination of symbols assigned to represent the combination of patterns defining the corresponding original character matrix, with at least certain ones of said characters having elements of different patterns which overlap, such that the elements that overlap are described for each pattern of which they form a part, with each symbol being positioned in the sparse matrix where a predetermined one of the elements forming the pattern defined by that symbol is positioned in the original character matrix; and storing in binary form in a storage device each sparse matrix representation in said complex character set as a compacted character, with the binary information stored for each compacted character being: (a) the symbols in the sparse matrix, (b) the positions of the symbols in the sparse matrix, and (c) the size parameters of the pattern represented by the symbol, if the symbol is in said second or third group of patterns.

6. In a complex character generator for generating a complex character set, with each character in said complex character set being described by an original m by n element matrix, where m and n are integers which may or may not be equal, defining in terms of elements, three groups of different patterns which occur frequently in said complex character set, namely, a first group which has a fixed size for each pattern, a second group which has one size parameter which must be specified for each pattern, and a third group which has a plurality of size parameters which must be specified for each pattern, assigning a different symbol to represent each of of said different patterns, defining a sparse m by n character matrix for each character in said complex character set in terms of the combination of symbols assigned to represent the combination of patterns defining the corresponding original character matrix, with at least certain ones of said characters having elements of different patterns which overlap, such that when the character is generated, the elements that overlap patterns are generated for each pattern of which they form a part, with each symbol being positioned in the sparse matrix where a predetermined one of the elements forming the pattern defined by that symbol is positioned in the original character matrix, the combination comprising:

a storage device in which each sparse matrix representation in said complex character set is stored as a compacted character, with the information stored for each compacted character being: (a) the symbols in the sparse matrix, (b) the positions of the symbols in the sparse matrix, and (c) the size parameters of the pattern represented by the symbol, if the symbol is in said second or third group of patterns;

a memory means in which information needed to generate each of said different patterns contained in said three groups of patterns is stored;

a programmed logic array in which information is stored relative to all of the different symbols, all of the positions in the sparse matrix, and all of the size parameters specified for the patterns in said second and third group of patterns;

means of retrieving from said storage device the information stored which defines a given compacted character; and means for responding to the retrieved information relative to said given compacted character by said logic array and the information stored in said memory means to generate each of said different patterns for generating the original character corresponding to said compacted character, with the elements that overlap patterns being generated for each pattern of which they form a part.

* * * * *